United States Patent
Haghighat et al.

(10) Patent No.: US 12,355,509 B2
(45) Date of Patent: Jul. 8, 2025

(54) METHOD FOR TRANSMISSION OF RADIO SIGNALS BETWEEN A TRANSMITTER DEVICE AND A WIRELESS TRANSMIT-RECEIVE UNIT USING A RECONFIGURABLE INTELLIGENT SURFACE AND CORRESPONDING DEVICE

(71) Applicant: InterDigital Patent Holdings, Inc., Wilmington, DE (US)

(72) Inventors: Afshin Haghighat, Ile-Bizard (CA); Mohammad Irfan, Chateauguay (CA); Zeeshan Sattar, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 107 days.

(21) Appl. No.: 18/282,697

(22) PCT Filed: Mar. 17, 2022

(86) PCT No.: PCT/US2022/020703
§ 371 (c)(1),
(2) Date: Sep. 18, 2023

(87) PCT Pub. No.: WO2022/197894
PCT Pub. Date: Sep. 22, 2022

(65) Prior Publication Data
US 2024/0178883 A1 May 30, 2024

(30) Foreign Application Priority Data

Mar. 17, 2021 (EP) .................................... 21305328
Sep. 30, 2021 (EP) .................................... 21306352

(51) Int. Cl.
*H04B 7/04* (2017.01)
*H04W 24/10* (2009.01)

(52) U.S. Cl.
CPC ........ *H04B 7/04013* (2023.05); *H04W 24/10* (2013.01)

(58) Field of Classification Search
CPC .......................... H04B 7/04013; H04B 7/0632; H04B 7/0639; H04B 7/0691; H04B 7/026; H04W 24/10
(Continued)

(56) References Cited

U.S. PATENT DOCUMENTS

2014/0328327 A1* 11/2014 Xiao ..................... H04L 5/0073
370/332
2021/0013619 A1* 1/2021 Alkhateeb .......... H04B 7/04013
(Continued)

FOREIGN PATENT DOCUMENTS

EP         3579449 A1     12/2019

OTHER PUBLICATIONS

Zhou et al., "Joint Transmit Precoding and Reconfigurable Intelligent Surface Phase Adjustment: A Decomposition-Aided Channel Estimation Approach", Institute of Electronics and Electrical Engineers (IEEE), IEEE Transactions on Communications, vol. 69, Issue 2, Feb. 2021, 16 pages.
(Continued)

*Primary Examiner* — Emmanuel Bayard
(74) *Attorney, Agent, or Firm* — Volpe Koenig

(57) ABSTRACT

Reconfigurable Intelligent Surface devices, RIS, may be used to improve receipt of radio signals received by wireless transmit-receive units, WTRUs, in a given area. In such area, WTRUs may receive radio signals directly from the transmitter, and indirectly, via reflection of the radio signals from the transmitter by the RIS device. A RIS may consist of programmable sub-wavelength sized unit cells placed in close proximity. Each unit cell behaves like a scatterer. Embodiments of a new RIS structure are described here, being based on a nearly passive reflecting platform. In a (Continued)

Nearly-Passive RIS structure according to embodiments, NP-RIS, each unit cell is programmed to have a constant invariable phase-shift. Embodiments of a unit cell selection method are described, to control the reflected wave by selecting a subset of unit cells whose reflection could assist coherent alignment of the reflected wave with the main direct signal at the WTRU.

12 Claims, 26 Drawing Sheets

(58) Field of Classification Search
USPC .................................................. 375/267, 299
See application file for complete search history.

(56) References Cited

U.S. PATENT DOCUMENTS

| | | | | |
|---|---|---|---|---|
| 2021/0344384 | A1* | 11/2021 | Dunna | H01Q 3/32 |
| 2022/0014935 | A1* | 1/2022 | Haija | H04L 5/0048 |
| 2022/0052764 | A1* | 2/2022 | Medra | H04B 10/614 |
| 2022/0059943 | A1* | 2/2022 | Saab | H04B 7/0617 |
| 2022/0247480 | A1* | 8/2022 | Papadopoulos | G01S 5/0273 |

OTHER PUBLICATIONS

Wu et al., "Towards Smart and Reconfigurable Environment: Intelligent Reflecting Surface Aided Wireless Network", Institute of Electronics and Electrical Engineers (IEEE), IEEE Communications Magazine, vol. 58, Issue 1, Jan. 2020, 7 pages.

Shen et al., "Dimension Reduced Channel Feedback for Reconfigurable Intelligent Surface Aided Wireless Communications", Institute of Electronics and Electrical Engineers (IEEE), IEEE Transactions on Communications, vol. 69, Issue 11, Nov. 2021, 13 pages.

Hu et al., "Beyond Massive MIMO: The Potential of Data Transmission with Large Intelligent Surfaces", Institute of Electronics and Electrical Engineers (IEEE), IEEE Transactions on Signal Processing, vol. 66, Issue 10, May 15, 2018, 13 pages.

Ellingson, S.W., "Path Loss in Reconfigurable Intelligent Surface-Enabled Channels", Cornell University Library, Electrical Engineering and Systems Science, Signal Processing, arXiv:1912.06759v1, Dec. 14, 2019, 7 pages.

Perovic et al., "Channel Capacity Optimization using Reconfigurable Intelligent Surfaces in Indoor mmWave Environments", Institute of Electronics and Electrical Engineers (IEEE), ICC 2020-2020 IEEE International Conference on Communications (ICC), Dublin, Ireland, Jun. 7, 2020, 7 pages.

Jung et al., "On the Optimality of Reconfigurable Intelligent Surfaces (RISs): Passive Beamforming, Modulation, and Resource Allocation", Cornell University Library, Computer Science, Information Theory, arXiv:1910.00968v2, Feb. 4, 2021, 33 pages.

Yang et al., "Intelligent Reflecting Surface Meets OFDM: Protocol Design and Rate Maximization", Cornell University Library, Computer Science, Information Theory, arXiv:1906.09956, Jun. 21, 2019, 30 pages.

Sattar et al., "Spectral Efficiency Analysis of the Decoupled Access for Downlink and Uplink in Two-Tier Network", Institute of Electronics and Electrical Engineers (IEEE), IEEE Transactions on Vehicular Technology, vol. 68, Issue 5, May 2019, 13 pages.

Zhang et al., "Reconfigurable Intelligent Surfaces Assisted Communications with Limited Phase Shifts : How many phase shifts are enough?", Institute of Electronics and Electrical Engineers (IEEE), IEEE Transactions on Vehicular Technology, vol. 69, Issue 4, Apr. 2020, 5 pages.

Basar et al., "Wireless Communications through Reconfigurable Intelligent Surfaces", Institute of Electronics and Electrical Engineers (IEEE), IEEE access, vol. 7, Aug. 13, 2019, 21 pages.

Sattar et al., "Full-Duplex Two-Tier Heterogeneous Network with Decoupled Access: Cell Association, Coverage, and Spectral Efficiency Analysis", Institute of Electronics and Electrical Engineers (IEEE), IEEE Access, vol. 8, Sep. 21, 2020, 14 pages.

Goldsmith, Andrea, "Wireless Communications", Cambridge University Press, 2005, 673 pages.

Yang et al., "Machine Learning for User Partitioning and Phase Shifters Design in RIS-Aided NOMA Networks", Cornell University Library, Computer Science, Information Theory, arXiv:2101.01212, Jan. 4, 2021, 30 pages.

Björnson et al., "Rayleigh Fading Modeling and Channel Hardening for Reconfigurable Intelligent Surfaces", Institute of Electronics and Electrical Engineers (IEEE), IEEE Wireless Communications Letters, vol. 10, Issue 4, Apr. 2021, 5 pages.

Liaskos et al., "A New Wireless Communication Paradigm through Software-controlled Metasurfaces", Institute of Electronics and Electrical Engineers (IEEE), IEEE Communications Magazine, vol. 56, Issue 9, Sep. 2018, 8 pages.

* cited by examiner

501

Selected Unit Cell ($\Gamma = 1$)

Unselected Unit Cell ($\Gamma = 0$)

METHOD FOR TRANSMISSION OF RADIO SIGNALS BETWEEN A TRANSMITTER DEVICE AND A WIRELESS TRANSMIT-RECEIVE UNIT USING A RECONFIGURABLE INTELLIGENT SURFACE AND CORRESPONDING DEVICE

CROSS-REFERENCE TO RELATED APPLICATIONS

This application U.S. National Stage Application under 35 U.S.C. 371 of International Patent Application No. PCT/US2022/020703, filed 17 Mar. 2022, which claims the benefit of European Patent Application No. 21305328.3 filed 17 Mar. 2021, and claims the benefit of European Patent Application No. 21306352.2 filed 30 Sep. 2021, each of which is incorporated herein by reference in their entirety.

BACKGROUND

Since the inception of wireless communications, the main focus of research efforts has been either on the intelligent design of transmission schemes or on the development of complex signal processing techniques for reception. Therefore, the reliability and quality of service (QOS) of any wireless communication link has always been governed by the capability of the end-nodes, i.e., transmitter or receiver.

There is a need for providing improvement of wireless channel quality that is not governed by capabilities of end-nodes.

SUMMARY

As mentioned in the background section, since the inception of wireless communications, the main focus of research efforts has been either on the intelligent design of transmission schemes or on the development of complex signal processing techniques for reception. Therefore, the reliability and quality of service (QOS) of any wireless communication link has always been governed by the capability of the end-nodes, i.e., transmitter or receiver.

Recently, significant advances have been made to control the wireless environment by embedding programmable metamaterials on potentially any surface in the environment. This gave birth to the idea of programmable wireless environments, where electromagnetic waves can be manipulated for the benefit of the end-user. Reconfigurable Intelligent Surface (RIS) is a generic term used for meta-surfaces that may improve the wireless channel quality between a transmitter and a receiver by manipulating the impinging electromagnetic signals to benefit their intended receiver.

As the development and deployment of the fifth-generation (5G) mobile communications, also known as new radio (NR), is still underway, potential applications of RIS in cellular communications are being considered for use in the emerging Sixth generation (6G) of cellular communication systems. It is expected that by marrying unique features of RIS with massive MIMO and beamforming technologies, further leaps in reliability, throughput, and spectrum efficiency can be achieved. Moreover, the employment of RIS is being viewed as a key enabler for further enhancements for systems operating in millimeter wave (mmW) and tera-hertz (THz) frequencies.

A typical RIS consists of many programmable sub-wavelength sized unit cells that are placed in close proximity of each other. The small size of these unit cells makes each unit cell behave like a scatterer. In an RIS platform, by separate tuning of the unit cells, the properties of the incident wave can be controlled to enhance the signal quality at the receiver. Also, due to sub-wavelength size of unit cells, a large number of them can be arranged on an RIS to better control the phase of the reflected wave and ensure a coherent alignment with the desired channel.

Since the pattern of applied phase-shift to unit cells of an RIS can greatly influence the received signal energy at the receiver, it is essential that they are optimized properly and efficiently to support the reliability of a wireless communication link. There is a growing number of research efforts focused on the optimization of phase shifters in an RIS structure. For example, based on machine learning methods, a solution using deep deterministic policy gradient algorithm to collaboratively control the phase-shifts of multiple unit cells of an RIS structure. A global co-phasing technique may jointly optimize the phase-shifts at the RIS and at the transmit precoder. Similarly, a two-stage method may successively determine the appropriate phase-shifts at each unit cell of the RIS and at the transmit precoder.

According to one aspect of the present disclosure, there are provided methods for transmission radio signals between a transmitter device and a wireless transmit-receive unit, WTRU, using a Reconfigurable Intelligent Surface device, RIS device, the methods being implemented by the transmitter device, according to the described embodiments and appended claims.

According to a further aspect of the present disclosure, embodiments of a transmitter device implementing at least one of the methods for transmission radio signals between a transmitter device and a wireless transmit-receive unit, WTRU, using a Reconfigurable Intelligent Surface device, RIS device, are described and claimed in the appended claims.

According to one aspect of the present disclosure, there are provided methods for a Reconfigurable Intelligent Surface device, RIS device, for reflection of radio signals between a transmitter device and a wireless transmit-receive unit, WTRU, wherein the methods are implemented by the RIS device, according to the described embodiments and appended claims.

According to a further aspect of the present disclosure, embodiments of a Reconfigurable Intelligent Surface device, RIS device, for reflection of radio signals between a transmitter device and a wireless transmit-receive unit, WTRU, are described and claimed in the appended claims.

According to one aspect of the present disclosure, there are provided methods for reception of radio signals from a transmitter device using a Reconfigurable Intelligent Surface device, RIS device, the methods being implemented by a wireless transmit-receive unit, WTRU, according to the described embodiments and appended claims.

According to a further aspect of the present disclosure, embodiments of a wireless transmit-receive unit, WTRU, for receiving radio signals from a transmitter device using a Reconfigurable Intelligent Surface device, RIS device, are described and claimed in the appended claims.

BRIEF DESCRIPTION OF THE DRAWINGS

Furthermore, like reference numerals in the figures indicate like elements, and wherein.

EXAMPLE NETWORKS FOR IMPLEMENTATION OF THE EMBODIMENTS

Figure 1A:
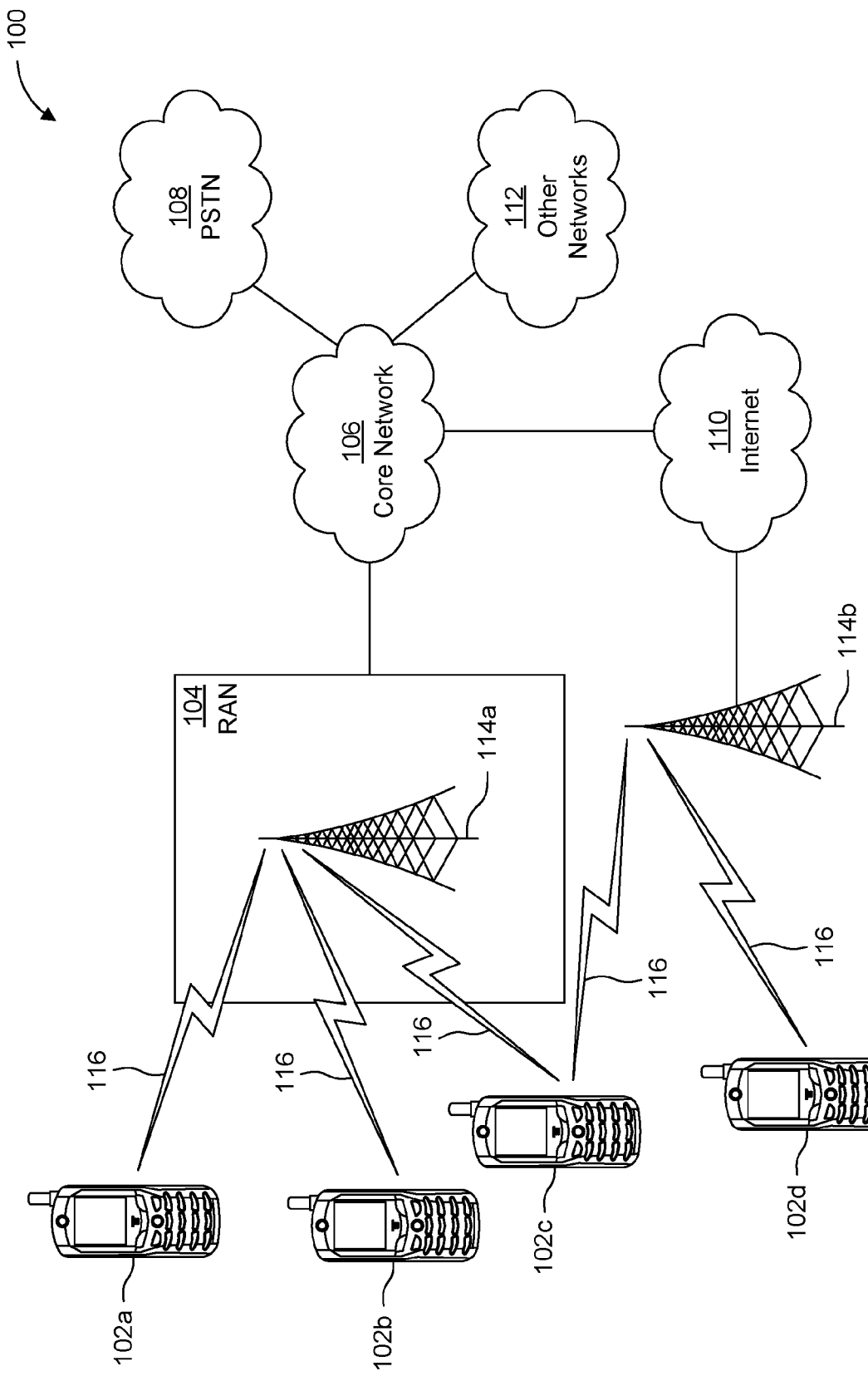
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
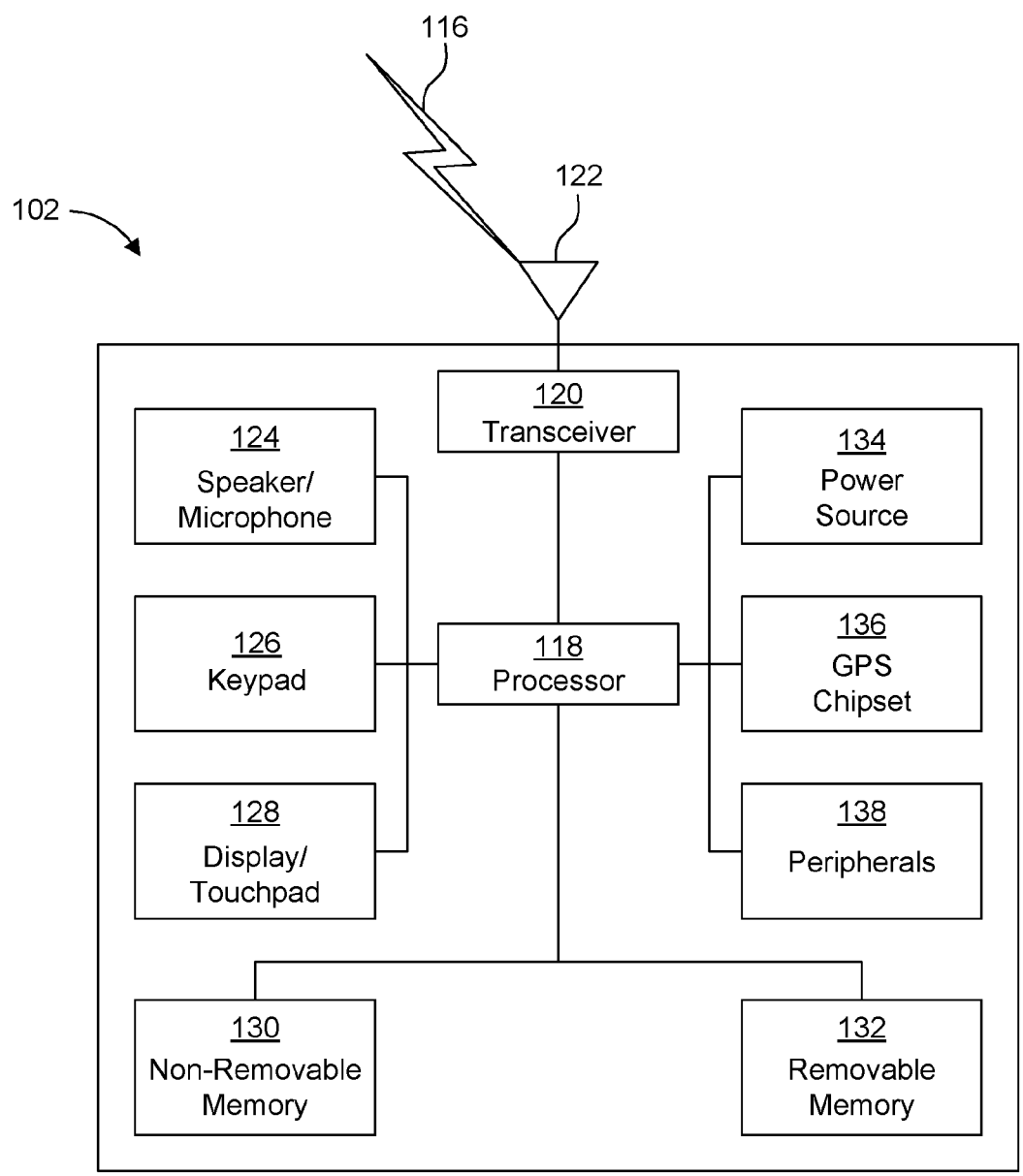
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include at least one processor 118, a transmitter/receiver or transceiver 120, a transmit/receive element 122, a speaker/ microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception).

Figure 1C:
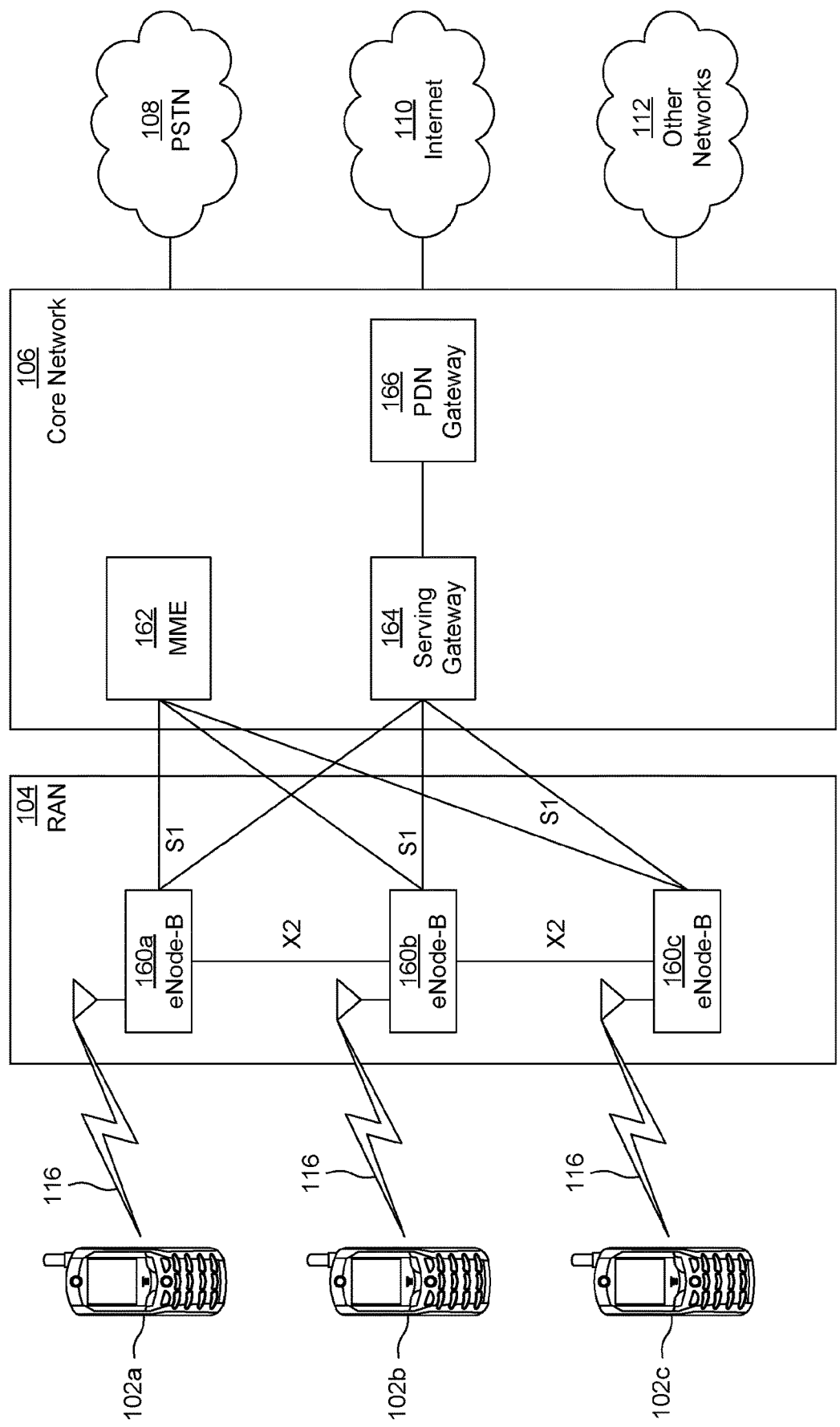
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHZ, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
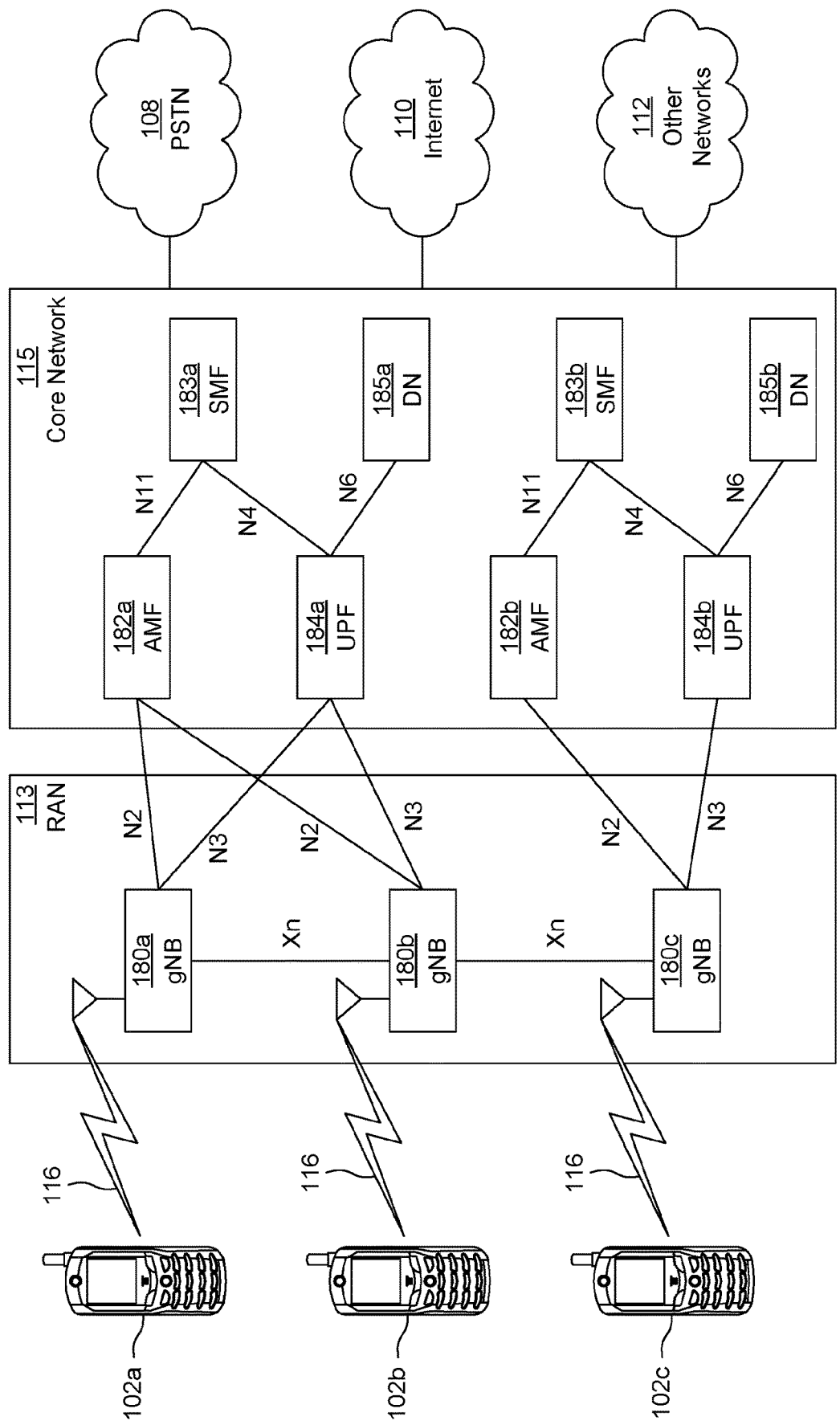
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Continuous phase-shifts at each unit cell of the RIS, implies an infinite resolution of each unit cell's phase-shift mechanism. Since the implementation of such a system is not cost efficient, the effect of limited phase-shifts on the achievable data rate of an RIS assisted communication system is investigated. Although the limited or quantized phase-shifts at each unit cell of the RIS are pragmatic, it still requires a sophisticated process to manage and control the phase-shift values. Therefore, embodiments of a new RIS structure are described here, the new RIS structure being based on a nearly passive reflecting platform. In a nearly passive RIS structure (NP-RIS), each unit cell is programmed to have a constant invariable phase-shift. Embodiments of a unit cell selection method are described, to control the reflected wave by selecting only the unit cells whose reflection could assist coherent alignment of the reflected wave with the main direct signal at the receiver.

Nearly Passive Reconfigurable Intelligent Surface with Constant Phase-Shifts

A wireless transmission system with single antenna transmitter (Tx) and a single antenna receiver (WTRU, Rx) is considered; however the same concept may be extended and applied in a MIMO transmission system as well. As demonstrated in FIG. 2, to improve reliability of the wireless communication link, a exemplary rectangular RIS 201 equipped with N unit cells is adopted to assist reception by proper reflection of the transmitted signal by a transmitter 200 (Tx, e.g. a base station 114a) towards a WTRU 202 (Rx, e.g., any of WTRUs 102a-d).

Structure of an RIS

The structure of an RIS may be composed of $N=N_H \times N_V$ electrically controlled $N_H$ unit cells per row and $N_V$ unit cells per column. It is assumed that each unit cell has an area $A_n = d_H \times d_V$, here $d_H$ and $d_V$ are the width and the height of each unit cell. When all the unit cells may be placed almost edge-to-edge on a rectangular grid, the total area of the RIS may correspond to $N \times A_n$. All the unit cells may be indexed row-by-row by index n, where $n \in [1, N]$.

The reflection property of each unit cell can be presented as $\Gamma_n = \gamma e^{\Phi n}$, where $\Gamma \in \{0,1\}$ and $\phi_n$ are amplitude and phase of the reflection factor of a unit cell, respectively. As such, full reflection and full absorption scenarios correspond to $\Gamma=1$ for $\Gamma=0$, respectively. Moreover, the phase property of each unit cell can be assumed selected from set of $2^k$ values uniformly distributed over the interval of $[0, 2\pi]$.

Channel Model

Figure 2:
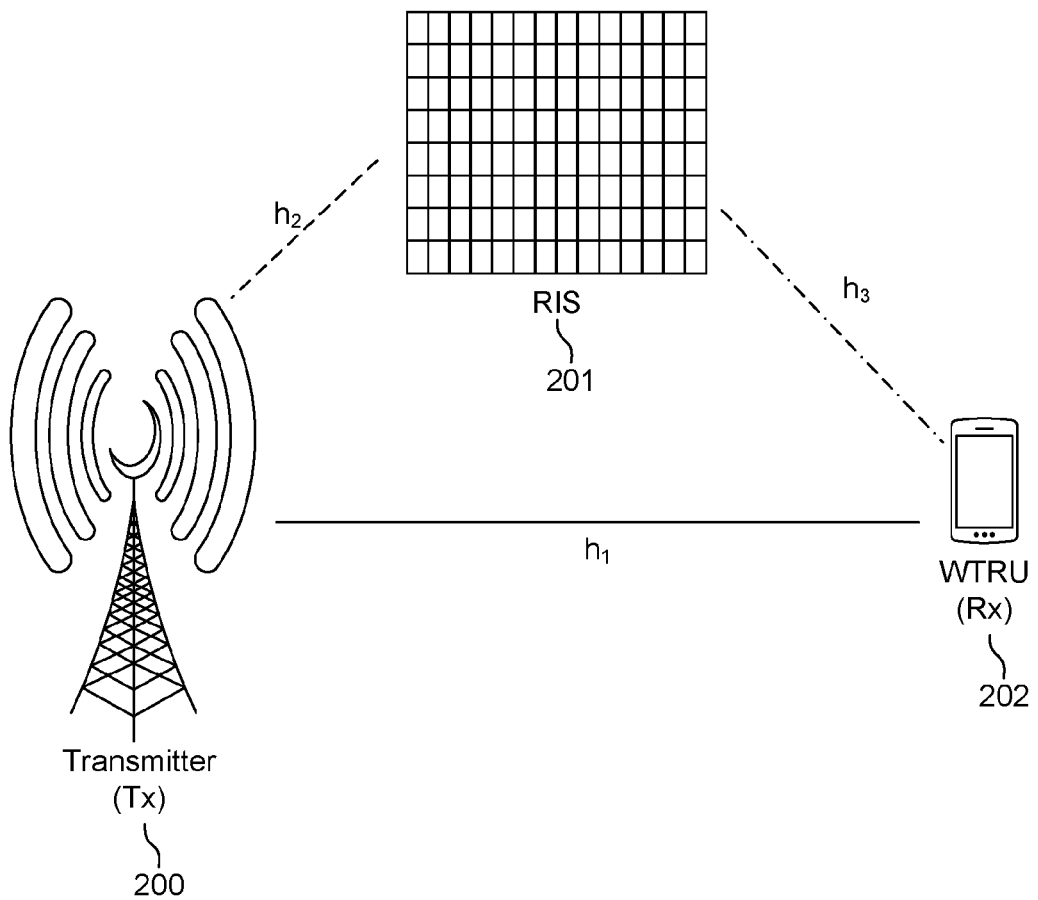
FIG. 2 is a system model including a transmitter device, a receiver device, and an RIS device.
Figure 3:
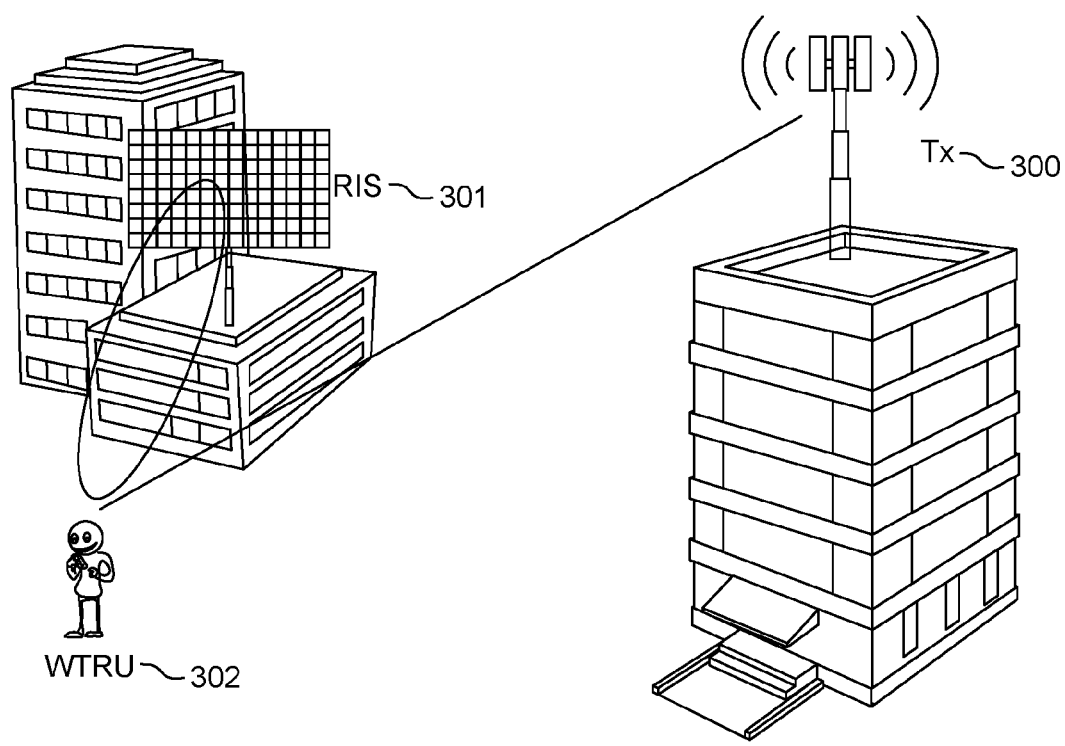
FIG. 3 is a communication model for an RIS-based wireless communication system.

FIG. 3 shows the basic communication model for an RIS-based wireless communication system where an RIS 301 is placed at a location for the benefit of the Tx 300 and Rx (WTRU) 302 units, see also FIG. 2. According to the present principles, the direct path channel is denoted by a complex coefficient $h_1$ (see FIG. 2) while Tx-RIS and RIS-Rx channels are represented by complex vectors $h_2 \in \mathbb{C}^N$ and $h_3 \in \mathbb{C}^N$, respectively (see FIG. 2). Assuming that directional reflections of the RIS may have more power concentrated on the line-of-sight (LOS) component of the channel, a Rician flat-fading channels can be considered.

$$h_m \sim \mathcal{N}_\mathbb{C}(\mu_m, \sigma_m^2 R) \qquad \text{Eq. 1}$$

where $m \in \{2,3\}$, $$\mu_m = \sqrt{\frac{K_m}{1+K_m}}, \sigma_m = \sqrt{\frac{1}{K_m+1}}, K_m$$

represents the Rician K-factor, and $R \in \mathbb{C}^{N \times N}$ is the spatial correlation matrix. Similarly, the direct Tx-Rx ($h_1$) (see FIG. 2) communication link is modeled as $h_1 \sim \mathcal{N}_\mathbb{C}(\mu_1, \sigma_1^2)$, where $\mu_1 = 0$ when LOS link between Tx and Rx does not exist.

It is worth mentioning that for independent and identically distributed channel, R becomes an identity matrix. However, due to proximity of unit cells in an RIS structure, such behavior is not observed. Therefore, according to the present principles, $h_2$ and $h_3$ are considered as spatially correlated channels.

Communication Model

For the system shown in FIG. 3, the combined received signal y can be expressed as $$y = \sqrt{P_t}(\sqrt{\beta_{RIS}} h_2^T \Phi h_3 + \sqrt{\beta_{TxRx}} h_1)x + w \qquad \text{Eq. 2}$$

where x is the transmitted signal, $P_t$ is the transmit power, $\beta_{RIS}$ is the path-loss of the Tx-RIS-Rx link, $\beta_{TxRx}$ is the path-loss of the Tx-Rx direct link, $w \sim \mathcal{N}_\mathbb{C}(0, \sigma^2)$ is the additive white Gaussian noise (AWGN), and $\Phi = \text{diag}(\Gamma_1, \Gamma_2, \ldots, \Gamma_N)$. Therefore, the achievable spectral efficiency for the system shown in FIG. 3 can be formulated as $$SE = \log_2\left(1 + \frac{P_t(\sqrt{\beta_{RIS}}|h_2^T \Phi h_3| + \sqrt{\beta_{TxRx}}|h_1|)^2}{\sigma^2}\right) \qquad \text{Eq. 3}$$

Path-Loss Model

A free space path-loss model is adopted for direct Tx-Rx as well as the RIS aided Tx-RIS-Rx links, which can be shown as $$\beta_{RIS} = \left(\frac{A_n}{4\pi d_2 d_3}\right)^2 \qquad \text{Eq. 4}$$

and $$\beta_{TxRx} = \left(\frac{\lambda}{4\pi d_1}\right)^2 \qquad \text{Eq. 5}$$

where $d_1$, $d_2$, and $d_3$ are corresponding distances for Tx-Rx, Tx-RIS and RIS-Rx links. The parameter $\lambda$ is the wavelength of the operating frequency. Parameter An is defined in the first paragraph of previous section "Structure of an RIS"

Moreover, for the purpose of the described embodiments, the RIS is assumed to be far enough from both Tx and Rx so that $d_2$ and $d_3$ are approximately the same for all the unit cells. In addition, $\beta_{RIS} \propto 1/(d_2 d_3)^2$ instead of $\beta_{RIS} \propto 1/(d_2 + d_3)^2$. The reason for this unexpected behavior is that the $\beta_{RIS}$ can only be proportional to $1/(d_2+d_3)^2$ if the scattering from the RIS is interpreted as specular reflection. However, the scattering from a surface can be described as specular reflection only if the reflecting surface is infinitely large or if the diffraction towards the Rx is negligible. Since that is not the case for an RIS, $\beta_{RIS}$ is proportional to $1/(d_2 d_3)^2$ instead of $1/(d_2+d_3)^2$.

Nearly Passive RIS Operation

Figure 4:
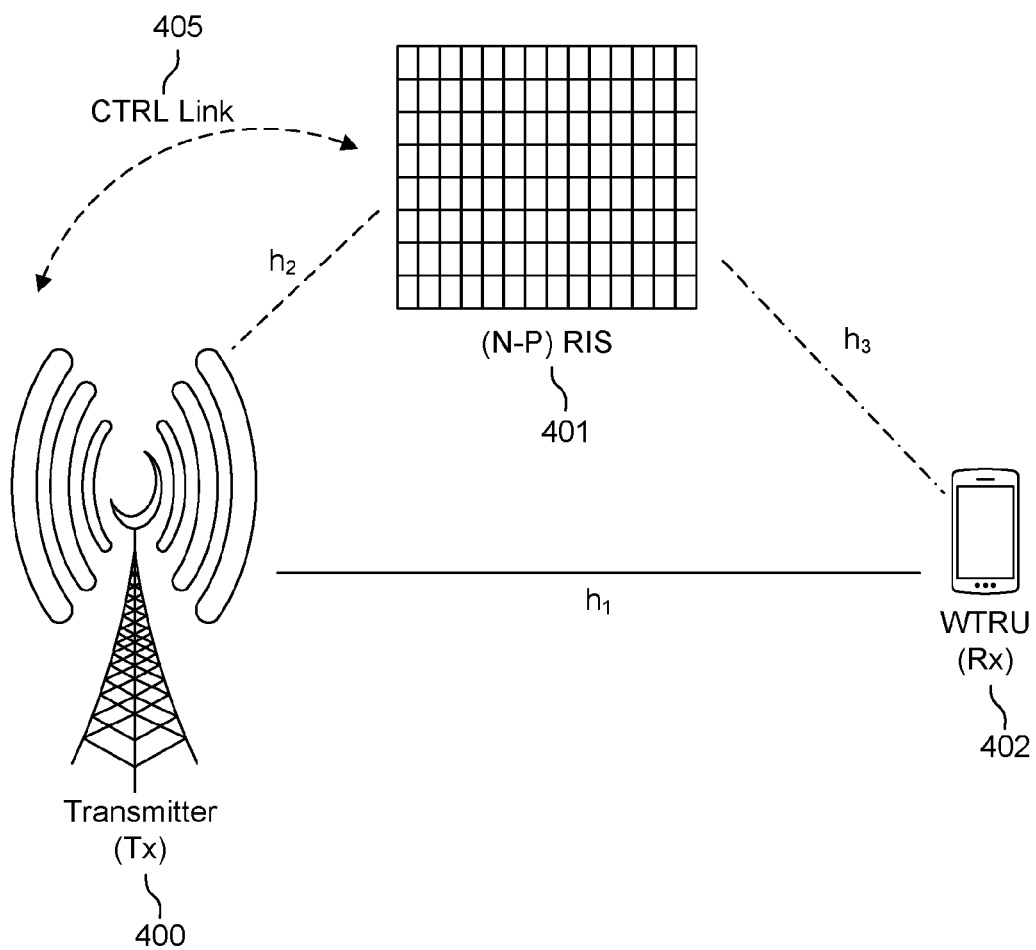
FIG. 4 is a system model including a transmitter device, an (NP) RIS device and a wireless transmit-receive unit according to embodiments.
Figure 5:
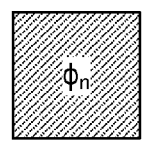
FIG. 5 is an embodiment of a nearly passive RIS structure (NP-RIS)
Figure 5:
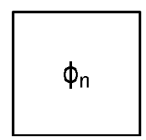

In this subsection, the operation of the described NP-RIS with unit cell selection for coherent alignment of the reflected wave with the desired channel is described. In FIG. 4 are depicted a transmitter device 400 according to embodiments (see also 1800 of FIG. 18), a RIS device 401 according to embodiments (see also 1700 of FIG. 17), and a WTRU 402 according to embodiments (see also 1900 of FIG. 19). A RIS device according to embodiments is also further referred to as NP-RIS. FIG. 5 shows a structure of a NP-RIS 501 according to an embodiment, showing a unit cell matrix with a reduced number of unit cells for explanative purposes. Unlike conventional unit cells with adjustable phase-shift such as RIS 201 of FIG. 2, in an NP-RIS according to embodiments, the phase $\phi_n$ of the reflection factor $\Gamma_n$ of each unit cell is fixed at an arbitrary value and is not changed (but may be configured to be set at the arbitrary value, when selected). However, as shown in FIG. 5, by selecting (activating) and unselecting (deactivating, deselecting, not selecting) of a unit cell (activated/selected unit cells are depicted in black, while deactivated/selected/not selected unit cells are depicted in white), the coefficient reflection of a unit cell alternates between a high (selected) and a low (not selected) reflection coefficient value, e.g., between $\Gamma=1$ and $\Gamma=0$, respectively. A deselection of a unit cell may be interpreted as the case with absorption of the impinged wave. In a typical NP-RIS aided wireless communication system according to embodiments, a transmitter (Tx) (e.g., 400) may send control signals to an NP-RIS via a dedicated control link (e.g., 405) to engineer the incident wave's properties to result in an enhanced reception at an Rx unit, for example at WTRU 402.

Figure 16:
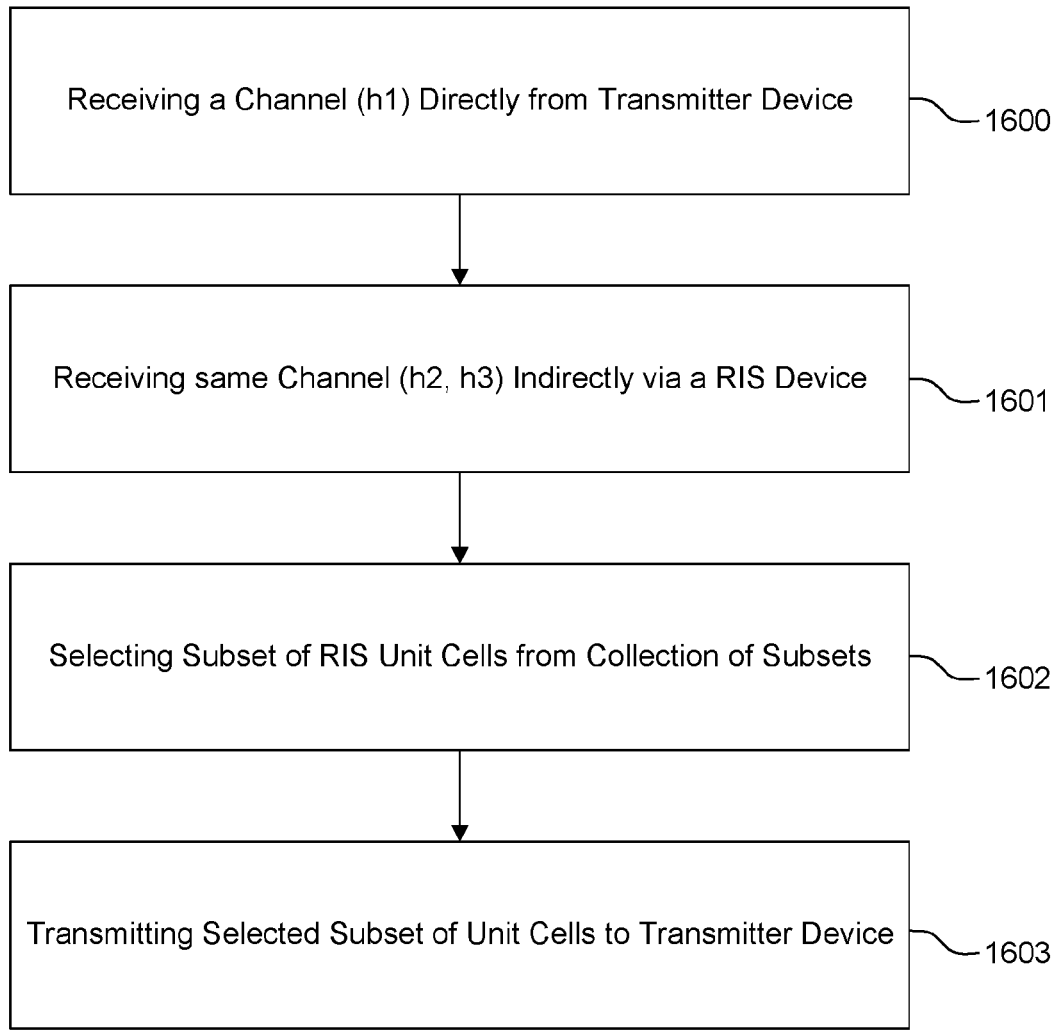
FIG. 16 is a flow chart of an embodiment of a method for reception of radio signals from a transmitter device using a RIS device, implemented by a WTRU.

According to a further embodiment, an Rx unit may provide some feedback directly to the NP-RIS or to the Tx to assist in phase configuration of the NP-RIS for the benefit of the Rx unit, see also FIG. 16.

The required bandwidth and the time slots needed for the dedicated control link are directly related to the number of unit cells as well as the resolution of phase-shift information for each unit cell of the RIS.

In an NP-RIS according to embodiments, the phase of the reflection factor $\Gamma_n$ of all unit cells may be fixed at an arbitrary value, and the only control of the NP-RIS is the selection of the unit cells so that their corresponding reflected wave can enhance coherency of reception at the receiver. In other words, instead of adjusting the phase of all unit cells to arrive at a favorable receive condition in a given location, according to embodiments, a subset of unit cells are selected so that through collective use of the direct (e.g., $h_1$) and indirect (e.g., $h_2$, $h_3$) channel(s), these channels combine in a favorable phase condition at the given location (spot, area) for the benefit of receive conditions for receiver units in that location, as depicted in FIG. 5 where four out of 16 units cells of an example 4×4 RIS are selected. Since the reflecting coefficient of each unit cell that is composed of amplitude and phase of the reflecting coefficient is fixed, the overhead for managing and control of NP-RIS drops significantly when compared to the previously discussed conventional unit cells with adjustable phase shift, as with the NP-RIS according to embodiments, no phase shift needs to be adjusted and only cell selection is done.

For presentation of the NP-RIS operation according to embodiments, it is assumed that the channel information about $h_2$ and $h_3$ (h2 and h3 are vectors) are known at the transmitter (Tx, e.g., the gNB). As described in the previous paragraph, according to embodiments, an objective is to find a subset of selected NP-RIS unit cells, which collective reflection results in a favorable phase when the reflected channel(s) is received at the Rx unit (e.g., a WTRU) together with the direct channel (e.g., $h_1$) received at the Rx unit (h1 is a scalar). In an exemplary solution, at each step, a different subset of NP-RIS unit cells may be considered, and then its collective reflection may be examined. The final selected subset ('best unit cell candidates') will be the subset that results in the least delay measured against the transmission of the main path (e.g., $h_1$). Thus, according to embodiments, an exemplary NP-RIS unit cell selection method or method for (improvement of) receipt of radio signals in a given (targeted) area may include the following steps:

Based on the channel information of $h_2$ and $h_3$, the ideal phase matrix that can maximize the received signal equals to:

$$\arg(\Phi_1) = \text{diag}((-\arg(h_{2,1}) - \arg(h_{3,1})), (-\arg(h_{2,2}) - \arg(h_{3,2})), \ldots, (-\arg(h_{2,N}) - \arg(h_{3,N}))), \quad \text{Eq. 6}$$

where $\arg(z \in \mathbb{C})$ is defined as the 2D polar angle $\varphi$ from the positive real axis to the vector representing z.

The Tx unit calculates the error matrix between the ideal $\arg(\Phi_1)$ and the given $\arg(\Phi)$ of the NP-RIS as:

$$\arg(\Phi_E) = \arg(\Phi_1) - \arg(\Phi). \quad \text{Eq. 7}$$

The Tx unit then sorts the indices of the $\arg(\Phi_E)$ with respect to the magnitude of $\arg(\Phi_E)$.

Based on the indices of the sorted $\arg(\Phi_E)$, the Tx unit selects the best unit cell candidates by transmitting information representative of unit cell selection (e.g., a bitmap, a list of indices of selected unit cells) to the NP-RIS controller via a dedicated control link.

When the information representative of unit cell selection is in the form of a bitmap, the bitmap is a representation of the unit cells, and the values in the bitmap correspond to the desired reflection amplitude of each unit cell, e.g. value '0' for low reflection amplitude (the corresponding unit cell is not selected), and '1' for high reflection amplitude (the corresponding unit cell is selected). As illustrated in FIG. 5, each selected unit cell reflects the impinging signal according to its phase, while unselected unit cells absorb the signal.

When the information representative of cell selection is in the form of a list of indices of selected unit cells, the indices may indicate the unit cells of which high reflection amplitude is desired, while low reflection amplitude is desired implicitly for indices not in the list.

According to a further embodiment compatible with the previously described method for improvement of reception of radio signals in a targeted area, the Rx unit assists the Tx unit in selection of unit cells on the NP-RIS:

Assuming availability of some information about channels $h_2$ and $h_3$, and also some knowledge of the phase settings of the NP-RIS, e.g., by configuration by the Tx unit, the Rx unit may perform subset selection of the NP-RIS unit cells e.g., from a collection of subsets known or identified to the Rx unit; and report the selection to the Tx unit. The report may be, for example, in the form of an index (or index list), a bit map, carried, for example, in a Channel Status Information (CSI) report.

According to an embodiment of the improvement of receipt of radio signals in a targeted area that is alternative to the further embodiment described in the previous paragraph, the Rx unit may report the preferred selection of unit cells directly to the NP-RIS. Similar, as the Tx-based selection mechanism, the Rx unit may perform subset selection of the unit cells e.g., from a collection of subsets known or identified to the Rx unit and report the selection to the NP-RIS. Again, the report may be in the form of, for example, an index, a bit map, carried in, for example, a CSI report.

Simulation Results

In this section includes an evaluation of simulation results of a system including an embodiment of the described NP-RIS. The main parameters used in the simulations are listed in Table I.

TABLE I

NP-RIS SYSTEM PARAMETERS

| Parameters | Value |
|---|---|
| Transmit power $P_t$ | 30 dBm |
| Height and width of each unit cell (dH = dV) | $\lambda/2$ |
| Carrier frequency $f_c$ | 28 GHz |
| Bandwidth (BW) | 250 MHz |
| RIS phase resolution (k) | 5 bits |
| Distance between Tx and Rx ($d_1$) | 75 meters |
| Rician factor ($K_1 = K_2$) | 3 dB |
| Rician factor ($K_3$) | 6 dB |
| Noise power $\sigma^2$ | −174 dBm/Hz + $10\log_{10}$(BW) + 10 dB |

Figure 6:
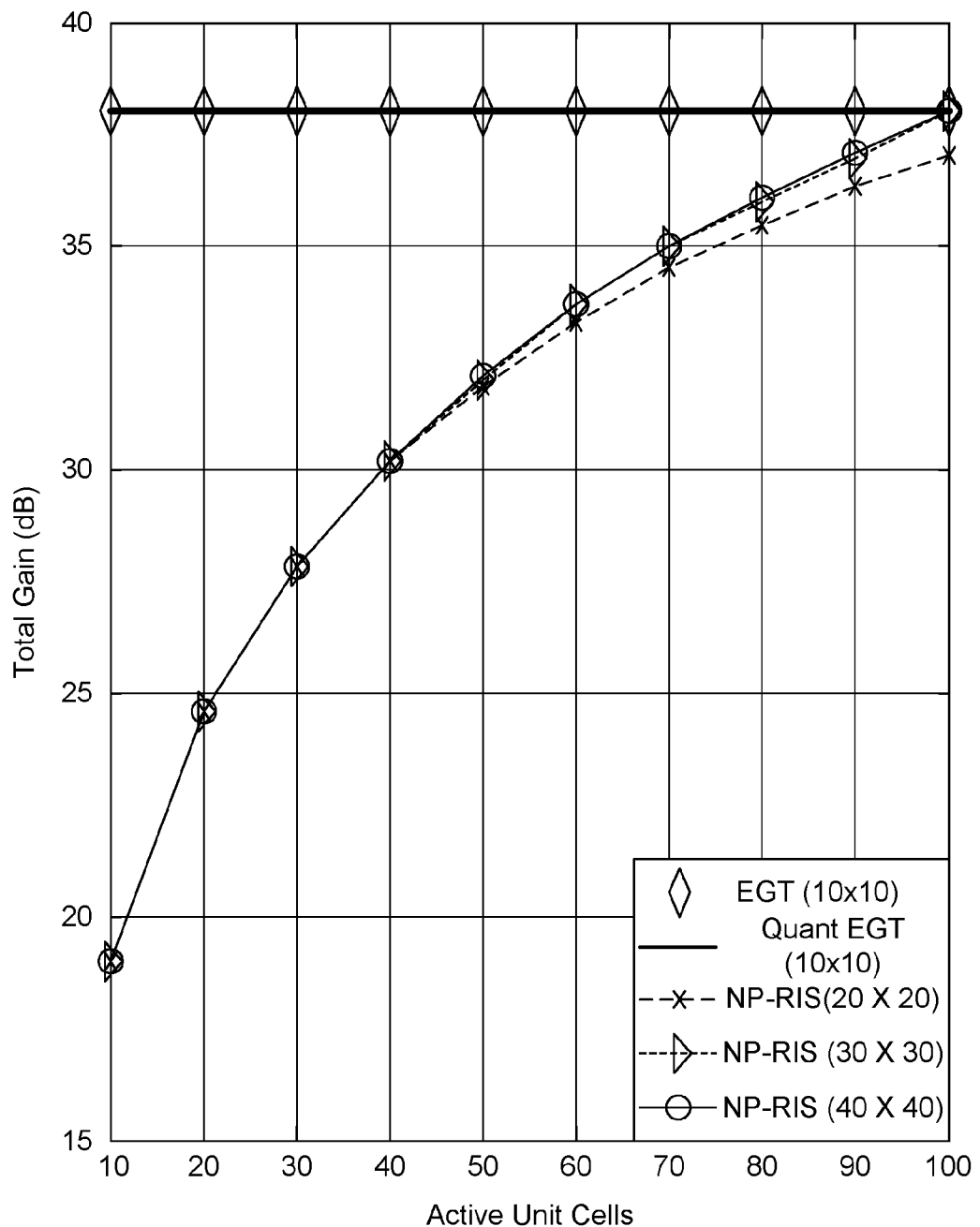
FIG. 6 is a graphical representation of performance of an NP-RIS with different grid sizes.

FIG. 6 illustrates performance of the proposed method, obtained by measuring the channel gain where the total channel gain is defined as:

$$(|h_2^T \Phi h_3| + |h_1|)^2 \quad \text{Eq. 8}$$

Figure 7:
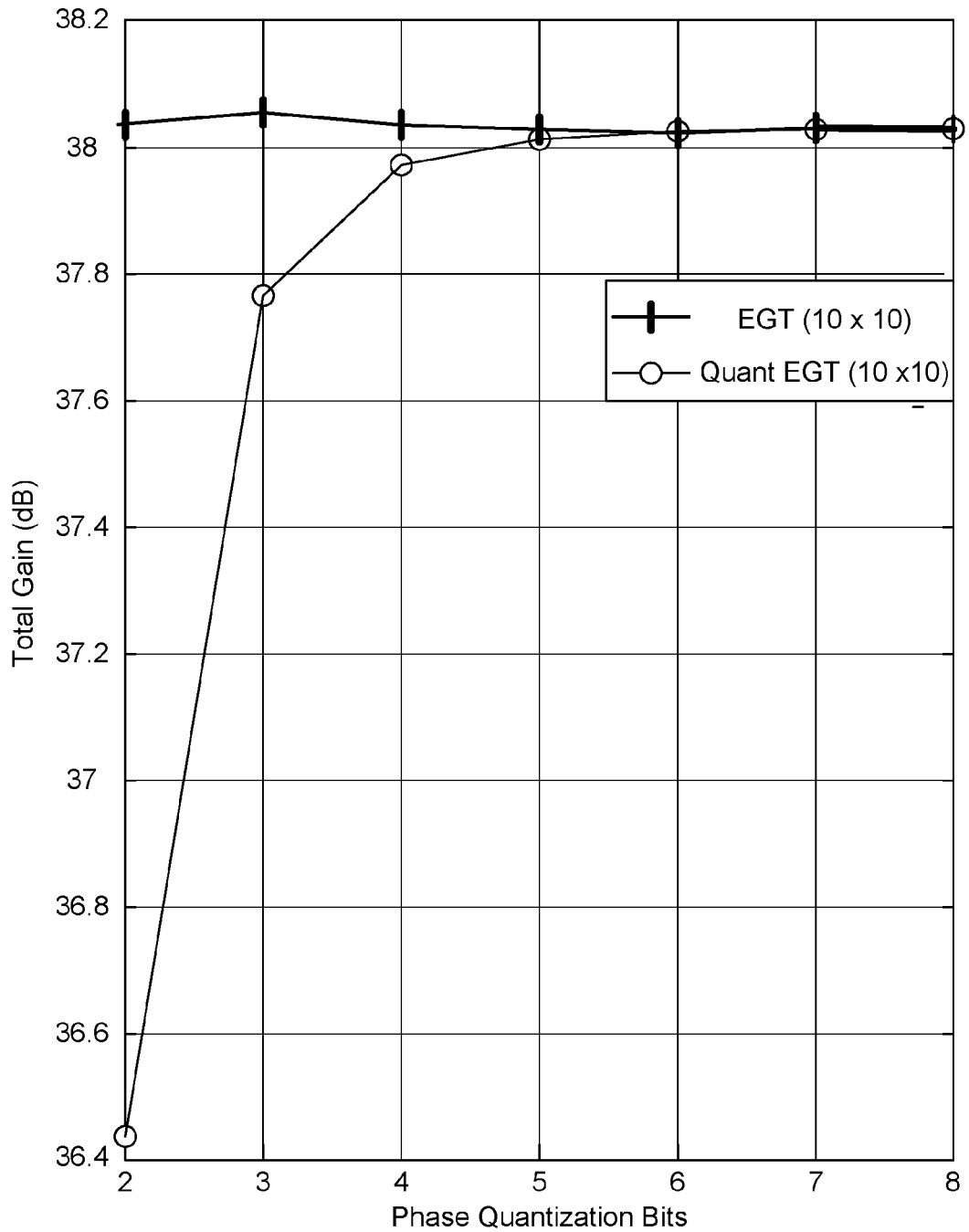
FIG. 7 is a graphical representation of 5-bit quantization for comparison.

For comparison, the performance of the NP-RIS system is measured against equal gain transmission (EGT) and quantized EGT (Quant EGT). In both cases of EGT and Quant EGT, all unit cells are considered with a difference that the phase shift for each cell in Quant EGT are quantized while in the EGT case an infinite precision for phase adjustment is assumed. In contrast to EGT and Quant EGT cases, in the case of NP-RIS, instead of employing the entire available unit cells, only a subset is selected. As a benchmark, the performance of RIS with a grid size 10×10 unit cells with and without quantization are shown in FIG. 6. For the case of Quant EGT, a 5 bit quantization of phase shift is assumed. A 5 bit quantization is adopted for the comparison because, as demonstrated in FIG. 7, a further increase in quantization level does not increase the total channel gain.

Further in FIG. 6, the performance of an embodiment of an NP-RIS with unit cell selections for different grid sizes of 20×20, 30×30, and 40×40 unit cells is shown. From the results presented in FIG. 6, an observation may be made. An NP-RIS system with 400 total unit cells and 100 selected unit cells can approach a similar performance as of a conventional RIS with 100 unit cells and full phase adjustments. First, by using a larger number of unit cells, a same level of performance can be achieved without any phase adjustment. In fact, by use of an NP-RIS and unit cell selection, it is possible to alleviate the complexities related to phase shifter network, and at the same time to reduce the associated control signaling without incurring any performance loss. It may be pointed out that employing a larger number of unit cells in a NP-RIS is not an issue, because sub-wavelength size of unit cells help an easy integration and deployment of such surfaces.

Figure 8:
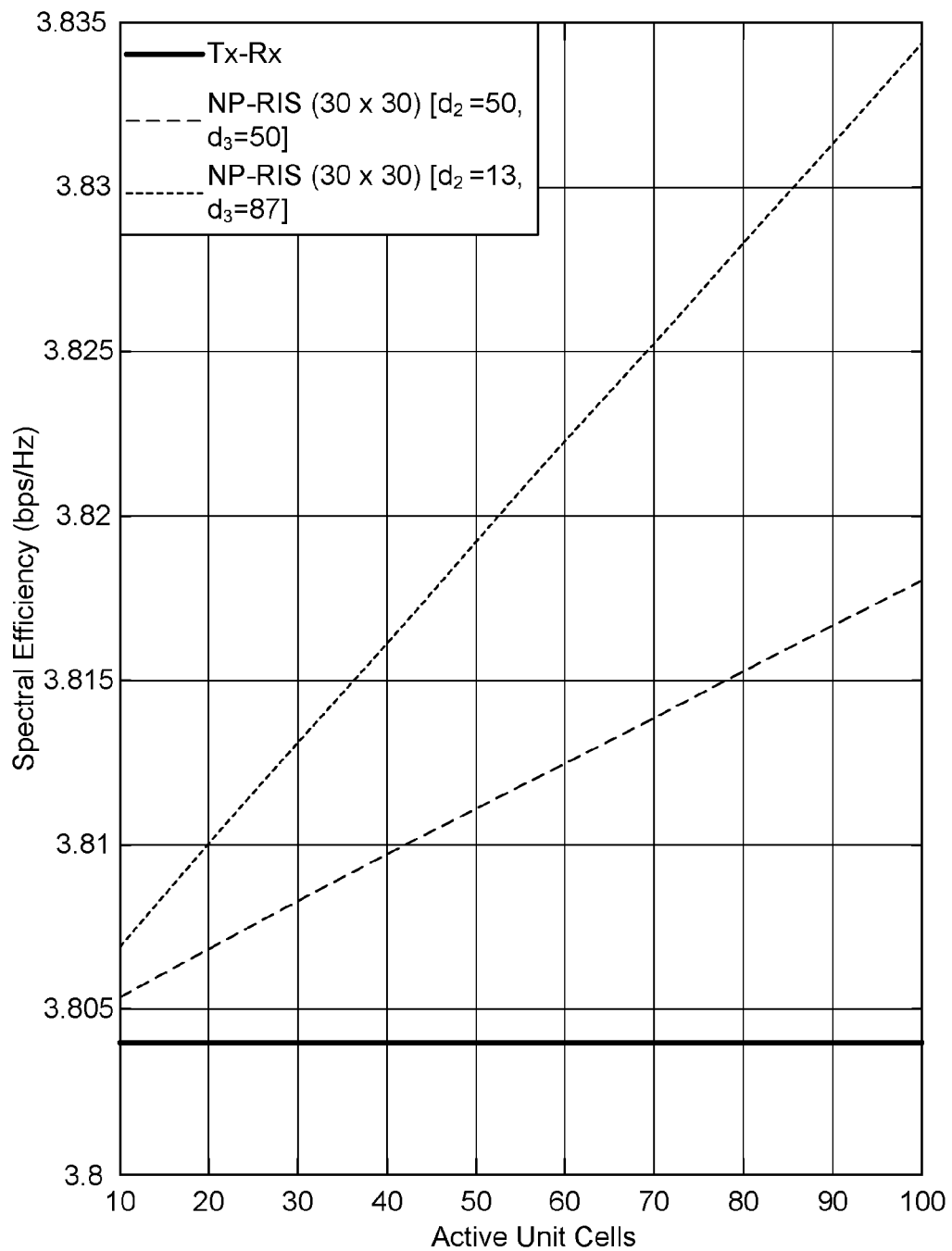
FIG. 8 is a graphical representation of spectral efficiency of an NP-RIS system according to embodiments.

FIG. 8 illustrates the spectral efficiency of an embodiment of an NP-RIS system. As mentioned earlier, $\beta_{RIS}$ is assumed proportional to $1/(d_2 d_3)^2$, therefore for a fixed total distance of the Tx-RIS-Rx link $(d_2+d_3)$, the location of the RIS can influence the achievable gain. For example, in FIG. 8, when the distance between the Tx and the RIS $(d_2)$ is reduced, while keeping the total distance unchanged, some improvements in gain can be observed. Therefore to exploit more gain from the reflection properties of the RIS, its placement with respect to the Tx and the Rx should be carefully selected.

Figure 9:
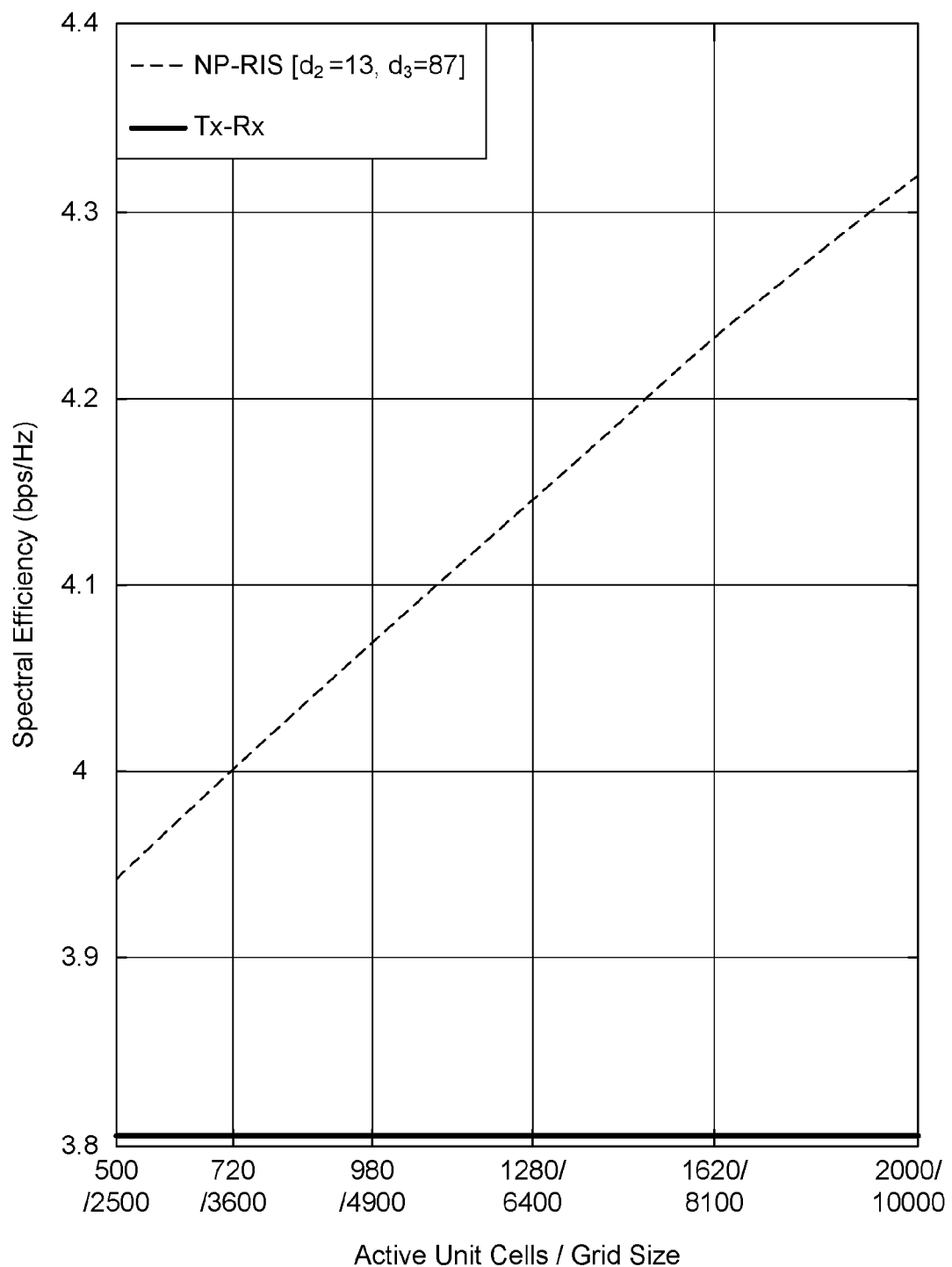
FIG. 9 is a graphical representation of the impact of the number of unit cells deployed on the NP-RIS according to an embodiment.

FIG. 9 shows the impact of the number of unit cells deployed on the NP-RIS on the achievable spectral efficiency. For all cases reported in FIG. 9, a fixed selection percentage of 20% unit cells is assumed. Observations from the presented result show that a significant gain may be obtained by increasing the RIS grid size while still keeping the percentage of active unit cells reasonably small. Moreover, a communication system with a large number of antenna elements at the Tx and the Rx can achieve even better performance gains by formulating the proposed NP-RIS unit cell selection method as an optimization problem.

To show the impact of time varying channel on the proposed unit cell selection method, we simulated the fading process as a first-order Gauss-Markov process for different values of the time variations parameter ρ.

$$h_m^t = \rho h_m^{t-1} + \sqrt{1-\rho^2} z_m^t.$$ Eq. 9

Figure 10:
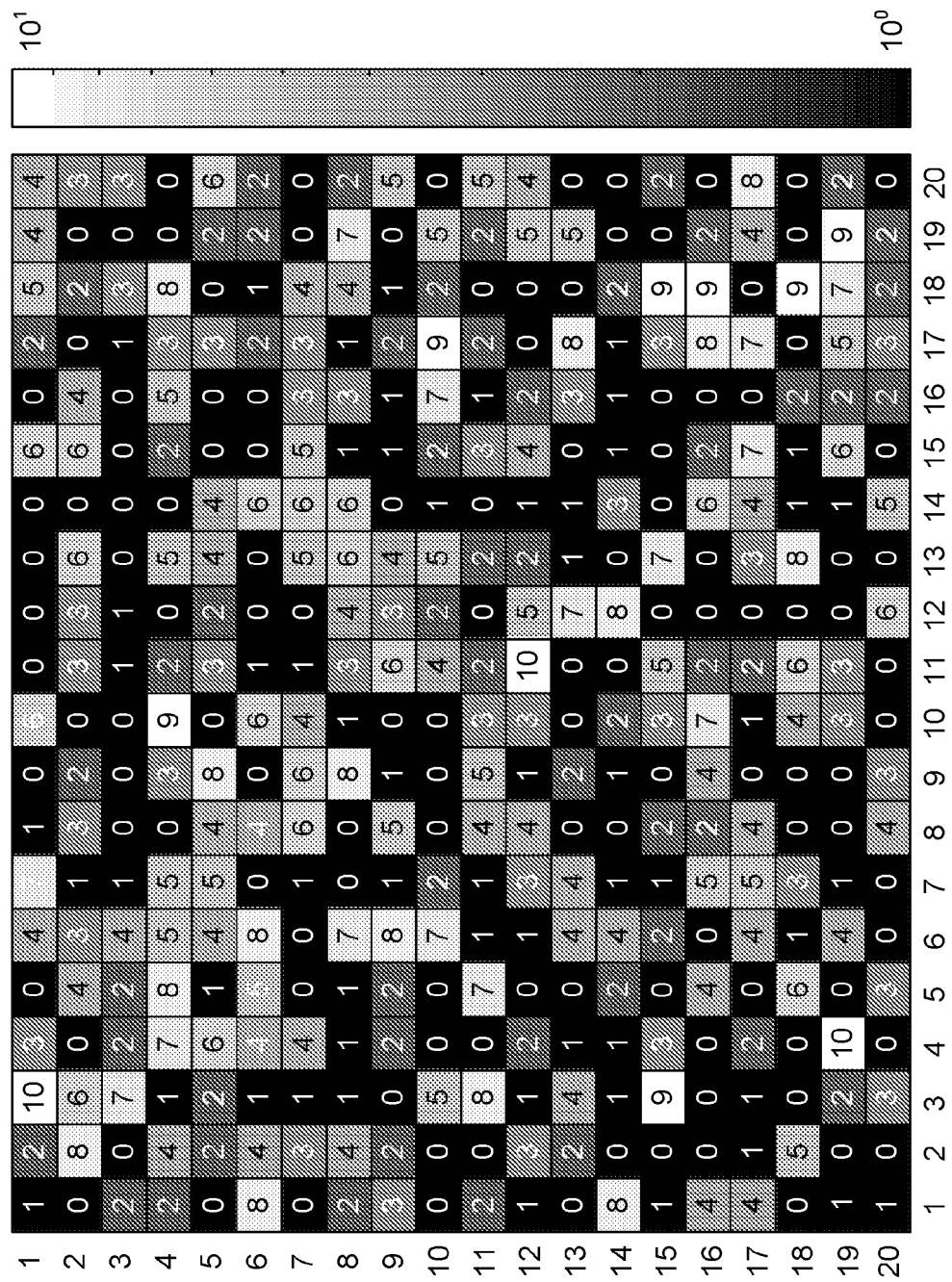
FIG. 10 is a heat map of 100 selected unit cells of a 20×20 NP-RIS grid according to an embodiment for ten consecutive transmissions, for ρ=0.90.
Figure 11:
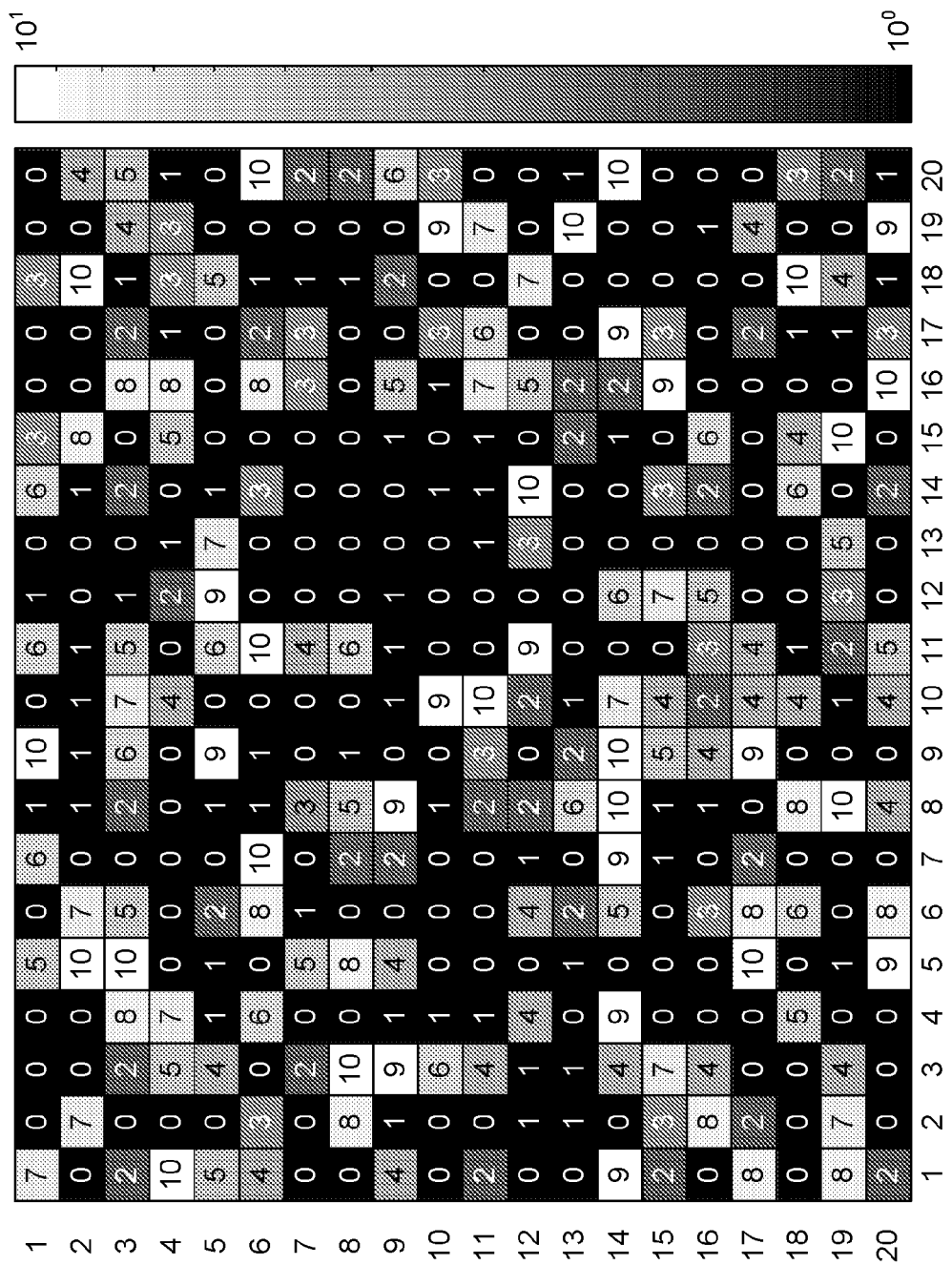
FIG. 11 is a heat map for ρ=0.95.
Figure 12:
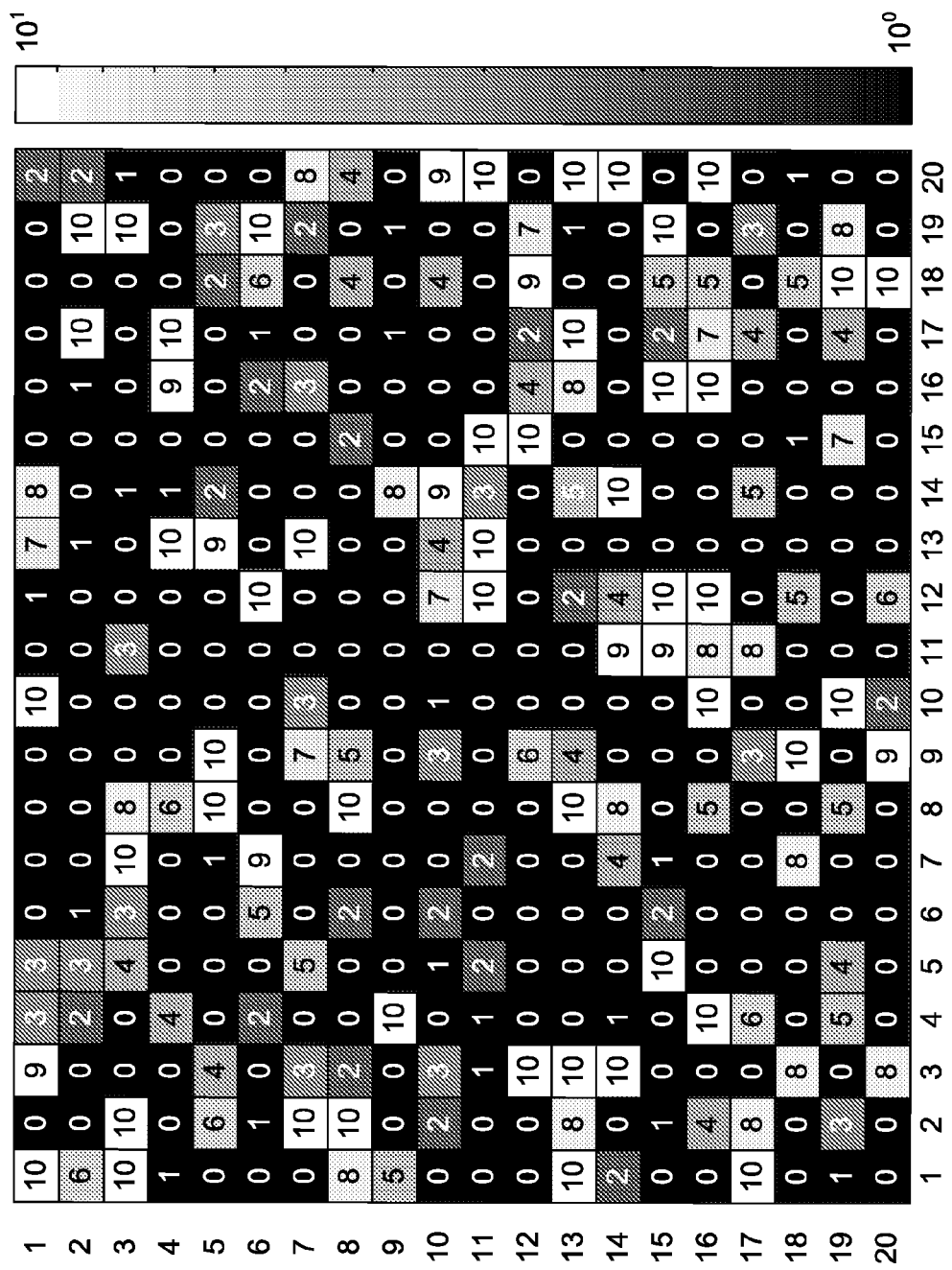
FIG. 12 is a heat map for ρ=0.99.
Figure 13:
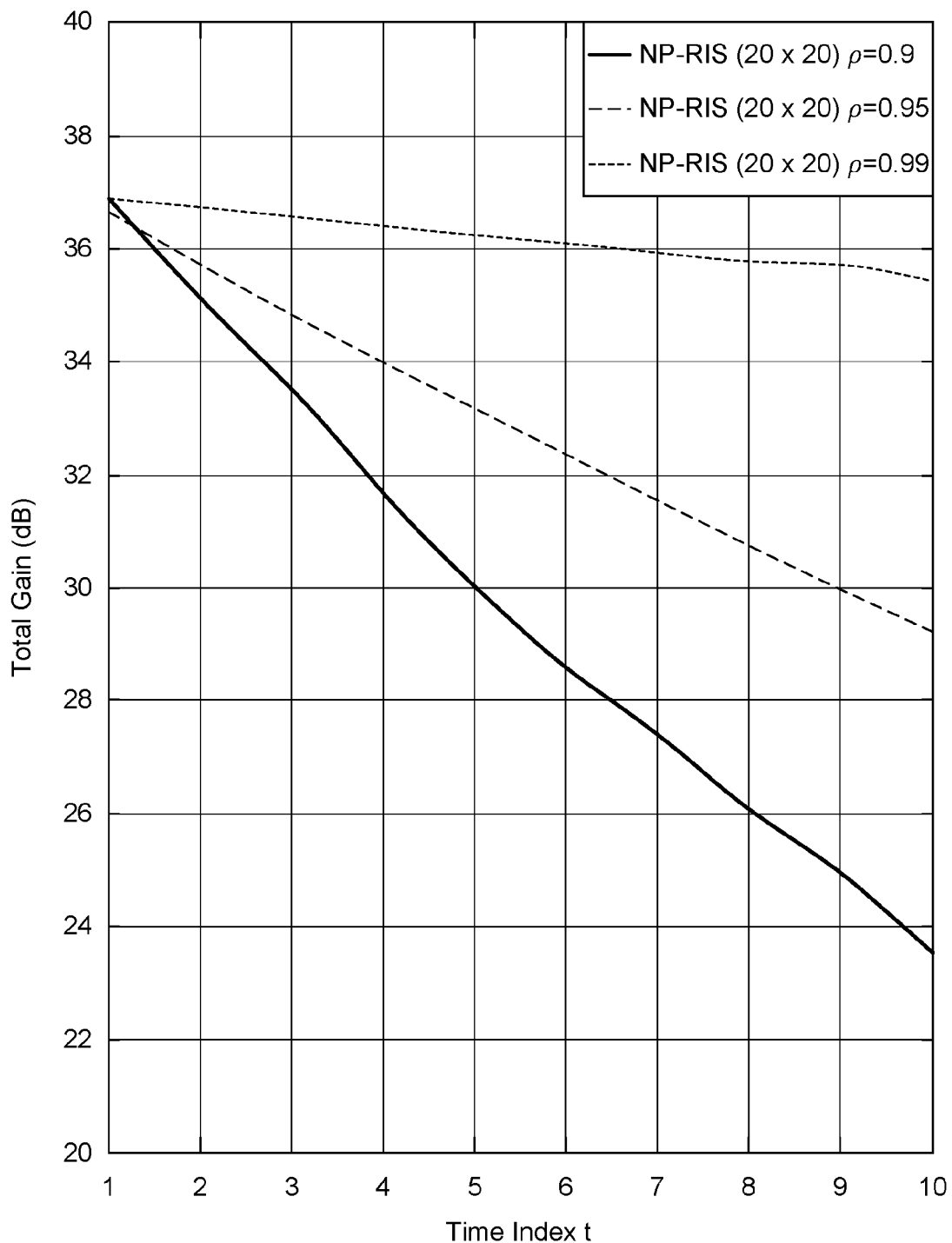
FIG. 13 is a graphical representation of impact of time varying channel on the total channel gain for a fixed bitmap of 100 selected unit cells of an NP-RIS grid of 20×20 according to an embodiment.

Here, t denotes the time index and $\{z_m\}$s are independent and identically distributed circular complex Gaussian variables with zero mean and variance equal to $\sigma_m^2$. The heatmaps of FIGS. 10-12 illustrate that, depending on the scale of the channel's time variations, most of the selected unit cells remain the same for time index t=10. In FIGS. 10-12, the black color represents a low heatmap 'temperature' (in a colored heatmap, black would be replaced by blue), while the white color represents a high heatmap 'temperature' (in a colored heatmap, this would be replaced by red), while further grey shades represent intermediate heatmap 'temperatures' (and would be replaced, in a colored heatmap, by blue blending into green, then blending into yellow, and then blending into orange). In FIGS. 10-12, the number shown in each unit cell is meant to show the number of times that the unit cell is selected for reflection (from 0 (black) to 10 (white)). As such, for the observed 10 consecutive slots, a "0" is to show that the unit cell was never selected, and a "10" to show that it was continuously selected. This result highlights that even a less frequent update of the bitmap of the selected unit cells would still provide a notable channel gain in a slow time-varying channels. FIG. 13 further emphasizes this point, and trends can be observed of the total channel gains over a time index t for a fixed bitmap of selected unit cells. It can also be observed that when the scale of the channel's time variations is small, i.e., ρ=0.99, the total channel gain does not change significantly over the time. Similarly, even at ρ=0.95 and ρ=0.90, the fixed bitmap of a selected unit cells provides notable channel gains for a time varying channel.

For the results shown in FIGS. 10-12, if the window of observation increases to a longer time, for example t=100 slots, then there will not be any unselected unit cells. Because due continuous change in channel, every unit cell will be eventually selected. On the other hand, during short periods of time in which the channel does not change much, the RIS can be left with a same selected subset of unit cells. Therefore, in a real deployment, the update rate may be based on the Doppler and mobility condition of the channel. In other words, update of subset selection may be reduced to match the coherence time of the channel.

Figure 14:
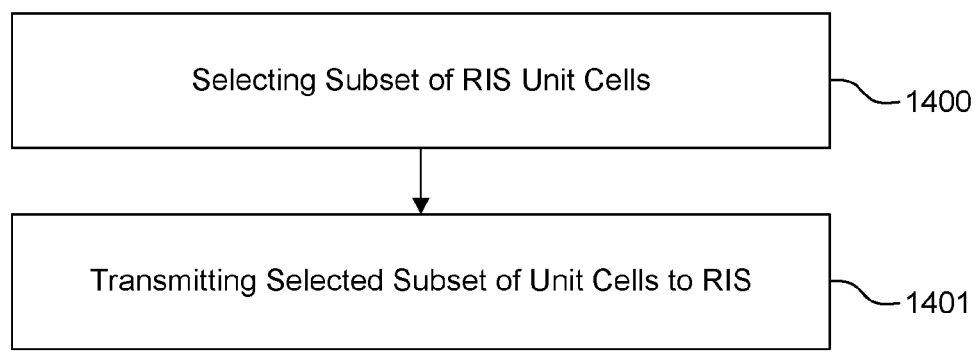
FIG. 14 is a flow chart of an embodiment of a method for transmission of radio signals using a Near-Passive Reconfigurable Intelligent Surface, NP-RIS, implemented by a transmitter device.

FIG. 14 is a flow-chart of an embodiment of a method for transmission of radio signals between a transmitter device (e.g., 400 or 1800) and a WTRU (e.g., 402 or 1900) using a Reconfigurable Intelligent Surface, RIS (e.g., 401, 1700), and in particular of transmission of a selected set of unit cells to the RIS device for configuration of the RIS device, the method being implemented by the transmitter device. The RIS device may comprise a matrix of unit cells, each unit cell may have a different preconfigured phase setting of a reflection factor for reflecting the radio signals, and each unit cell may be configurable to be selected or to be not selected, a selection may correspond to a high radio signal reflection amplitude and a non-selection may correspond to a low radio signal reflection amplitude lower than the high reflection amplitude.

In 1400, a subset of unit cells of the RIS device is selected that contribute to receipt, by the WTRU, of at least one radio channel transmitted from the transmitter device to the WTRU when the WTRU is located in a given area where the WTRU receives the radio channel (h1) directly from the transmitter device and where the WTRU receives the radio channel indirectly (h3) from the transmitter device via the RIS device, the selecting performing a selection of a subset of unit cells that result in a least delay of the radio channel indirectly received by the WTRU from the transmitter device via the RIS device compared against the radio channel received by the WTRU directly from the transmitter device.

In 1401, the selected subset of unit cells is transmitted to the RIS device for configuration of the RIS device.

According to an embodiment of the method for transmission of radio signals between the transmitter device and the WTRU using the Reconfigurable Intelligent Surface, the selected subset of unit cells is transmitted to the RIS as information representative of unit cell selection of RIS unit cells.

According to an embodiment of the method for transmission of radio signals between the transmitter device and the WTRU using the Reconfigurable Intelligent Surface, the information representative of cell selection of RIS unit cells is transmitted over a control channel for configuring the RIS device.

According to an embodiment of the method for transmission of radio signals between the transmitter device and the WTRU using the Reconfigurable Intelligent Surface, the information representative of unit cell selection is in the form of a bitmap being a representation of the unit cells, and a value for each bit in the bitmap corresponding to a reflection amplitude to be configured for the corresponding unit cell, the value comprising a first value for low reflection amplitude when the corresponding unit cell is not selected, and a second value different from the first value for high reflection amplitude when the corresponding unit cell is selected.

According to an embodiment of the method for transmission of radio signals between the transmitter device and the WTRU using the Reconfigurable Intelligent Surface, the information representative of unit cell selection is in the form a list of indices, the indices indicating, for selected unit cells of which high reflection amplitude is desired, while low reflection amplitude is desired for indices of not selected unit cells, not in the list.

According to an embodiment of the method for transmission of radio signals between the transmitter device and the WTRU using the Reconfigurable Intelligent Surface, the transmitter device further receives, from the WTRU, a RIS unit cell subset selection performed by the WTRU for assisting the transmitter device in selecting a subset of unit cells of the RIS device, wherein the WTRU RIS unit cell subset selection is based on information available to the WTRU about phase settings of the RIS unit cells and about channel information relating to a channel (h2) between the transmitter device and the RIS device and relating to a channel (h3) between the RIS device and the WTRU.

According to an embodiment of the method for transmission of radio signals between the transmitter device and the WTRU using the Reconfigurable Intelligent Surface, the RIS unit cell subset selection performed by the WTRU is received by the transmitter device from the WTRU in a Channel Status Information report.

Figure 15:
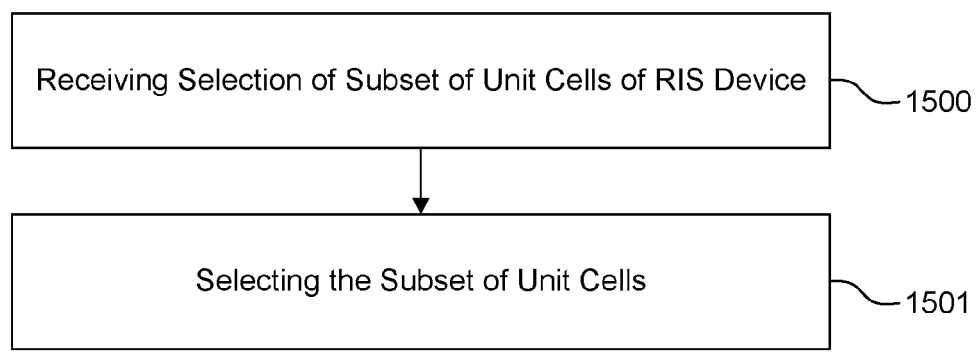
FIG. 15 is a flow chart of an embodiment of a method for an RIS device for reflection of radio signals between a transmitter device and a WTRU, implemented by the RIS device.

FIG. 15 is a flow-chart of a method for a Reconfigurable Intelligent Surface device, RIS device (e.g., 401, 1700), for reflection of radio signals between a transmitter device (e.g., 400, 1800) and a wireless transmit-receive unit, WTRU (e.g., 402, 1900), and in particular of selection of a subset of unit cells of the RIS device as indicated in a selection of the subset of unit cells received from the transmitter device, wherein the method is implemented by the RIS device. The RIS device comprises a matrix of unit cells, each unit cell being configured to have a different preconfigured phase setting of a reflection factor for reflecting the radio signals, and each unit cell being configurable to be selected or to be not selected, a selection corresponding to a high radio signal reflection amplitude and a non-selection corresponding to a low radio signal reflection amplitude lower than the high reflection amplitude.

In 1500, the RIS device receives (1500), from the transmitter device, a selection of a subset of unit cells of the RIS device that contribute to receipt, by the WTRU, of at least one radio channel transmitted from the transmitter device to the WTRU when the WTRU is located in a given area where the WTRU receives the radio channel directly from the transmitter device and indirectly from the transmitter device via the RIS device, the selected subset of unit cells resulting in a least delay of the radio channel indirectly received by the WTRU from the transmitter via the RIS device compared against the radio channel directly received by the WTRU from the transmitter device.

In 1501, the RIS device selects the subset of unit cells of the RIS device as indicated in the selection of the subset of unit cells received from the transmitter device.

According to a further embodiment of the method for a RIS device, the selected subset of unit cells is received from the transmitter device as information representative of unit cell selection of RIS unit cells.

According to a further embodiment of the method for a RIS device, the information representative of unit cell selection of RIS unit cells is received from the transmitter device over a control channel for configuring the RIS device.

According to a further embodiment of the method for a RIS device, the information representative of unit cell selection is received by the RIS device in the form of a bitmap being a representation of the unit cells, and a value for each bit in the bitmap corresponding to a reflection amplitude to be configured for the corresponding unit cell, the value comprising a first value for low reflection amplitude when the corresponding unit cell is not selected, and a second value different from the first value for high reflection amplitude when the corresponding unit cell is selected.

According to a further embodiment of the method for a RIS device, the information representative of unit cell selection is received by the RIS device in the form a list of indices, the indices indicating, for selected unit cells of which high reflection amplitude is desired, while low reflection amplitude is desired for indices of not selected unit cells, not in the list.

FIG. 16 is a flow-chart of a method for reception of radio signals from a transmitter device (e.g., 400, 1800) using a Reconfigurable Intelligent Surface device, RIS device (e.g., 401, 1700), the method being implemented by a wireless transmit-receive unit, WTRU (e.g., 402, 1900).

In 1600, the WTRU receives a channel (e.g., h1) directly from the transmitter device.

In 1601, the WTRU receives the same channel (e.g., h2, h3) indirectly from the transmitter device via the RIS. The RIS comprises a matrix of unit cells, each unit cell being configured to have a different preconfigured phase setting of a reflection factor for reflecting the radio signals, and each unit cell being configurable to be selected or to be not selected, a selection corresponding to a high radio signal reflection amplitude and a non-selection corresponding to a low radio signal reflection amplitude lower than the high reflection amplitude.

In 1602, the WTRU assists the transmitter device in selecting a subset of RIS unit cells from a collection of subsets identified to the WTRU, the unit cell subset selection being based on information available to the WTRU about phase settings of the RIS unit cells and about channel information relating to a channel (e.g., h2) between the transmitter device and the RIS device and relating to a channel (e.g., h3) between the RIS device and the WTRU. Subset selection is possible as it is not required to include all unit-cells to be included during the operation. Subset selection may help reduce the feedback load. How subset selection is done is treated in section "Compression of Channel Status Information (CSI) feedback in RIS-based transmission" further on in this document.

In 1603, the WTRU transmits the unit cell subset selection to the transmitter device.

Figure 17:
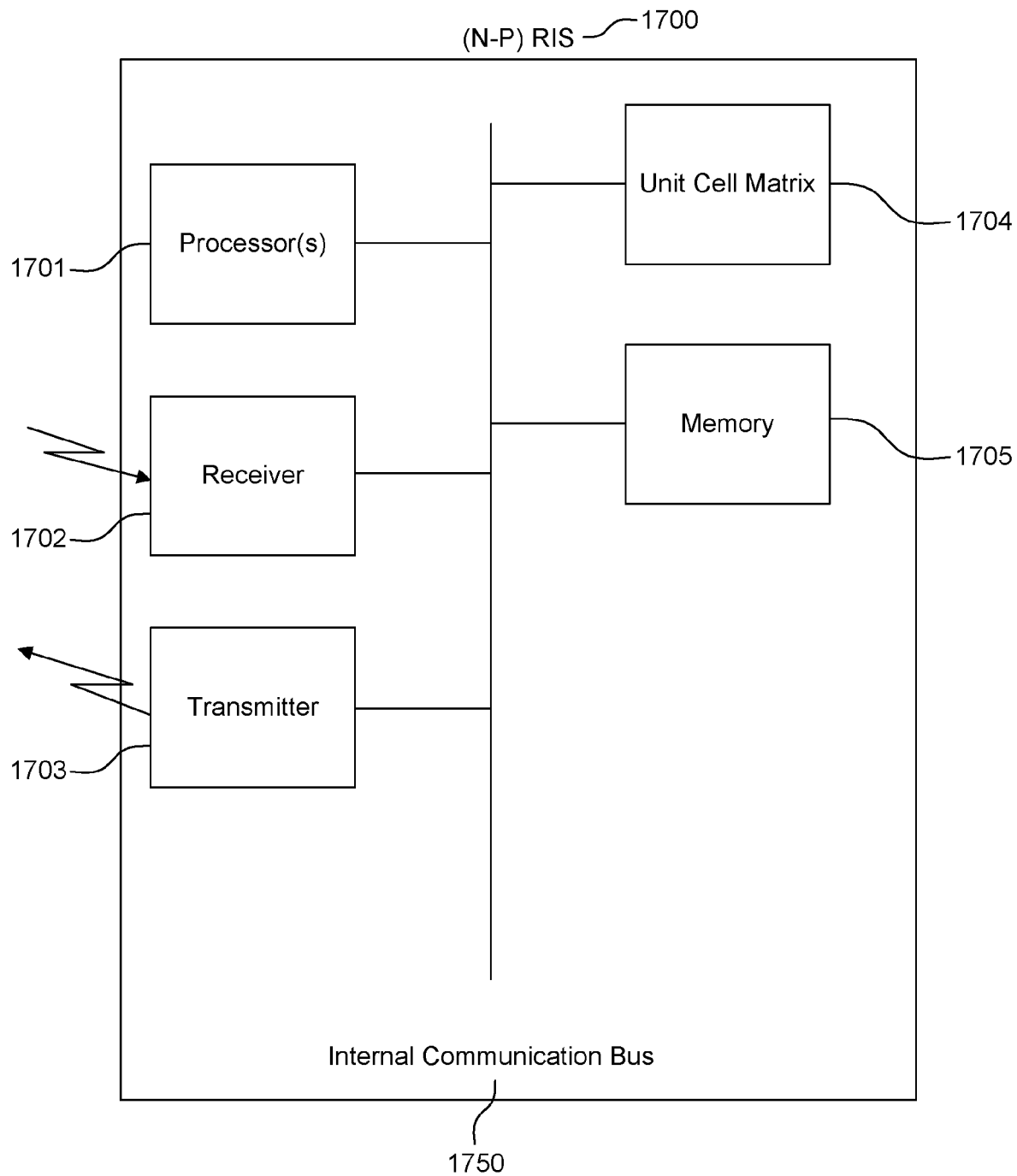
FIG. 17 is an embodiment of a RIS device.

FIG. 17 is an RIS device according to an embodiment (e.g., 401, 1700), for reflection of radio signals between a transmitter device (e.g., 1800, 400) and a wireless transmit-receive unit, WTRU (402, 1900). The RIS device comprises at least one processor 1701, a receiver 1702, and a matrix of unit cells 1704, a transmitter (1703) (optionally, e.g., for control link 405) and a memory 1705 (e.g., for storage of RIS configurations such as unit cell selections). Each of the elements 1701-1705 are connected to an internal communication bus 1750. Each unit cell of the matrix 1704 of the RIS device is configured to have a different preconfigured phase setting of a reflection factor for reflecting the radio signals, and each unit cell being configurable to be selected or to be not selected, a selection corresponding to a high radio signal reflection amplitude and a non-selection corresponding to a low radio signal reflection amplitude lower than the high reflection amplitude.

The receiver 1702 is configured to receive, from the transmitter device, a selection of a subset of unit cells of the RIS device that contribute to receipt, by the WTRU, of at least one radio channel transmitted from the transmitter device to the WTRU when the WTRU is located in a given area where the WTRU receives the radio channel directly from the transmitter device and indirectly from the transmitter device via the RIS device, the selected subset of unit cells resulting in a least delay of the radio channel indirectly received by the WTRU from the transmitter via the RIS device compared against the radio channel directly received by the WTRU from the transmitter device.

The at least one processor 1701 is configured to select the subset of unit cells of the RIS device as indicated in the selection of the subset of unit cells received by the receiver.

According to a further embodiment of the RIS device, the receiver 1702 is configured to receive the selected subset of unit cells from the transmitter device as information representative of cell selection of RIS unit cells.

According to a further embodiment of the RIS device, the receiver 1702 is further configured to receive the information representative of unit cell selection of RIS unit cells from the transmitter device over a control link 405 for configuring the RIS device.

According to a further embodiment of the RIS device, the receiver 1702 is further configured to receive the information representative of unit cell selection in the form of a bitmap being a representation of the unit cells, and a value for each bit in the bitmap corresponding to a reflection amplitude to be configured for the corresponding unit cell, the value comprising a first value for low reflection amplitude when the corresponding unit cell is not selected, and a second value different from the first value for high reflection amplitude when the corresponding unit cell is selected.

According to a further embodiment of the RIS device, the receiver 1702 is further configured to receive information representative of unit cell selection in the form a list of indices, the indices indicating, for selected unit cells of which high reflection amplitude is desired, while low reflection amplitude is desired for indices of not selected unit cells, not in the list.

Figure 18:
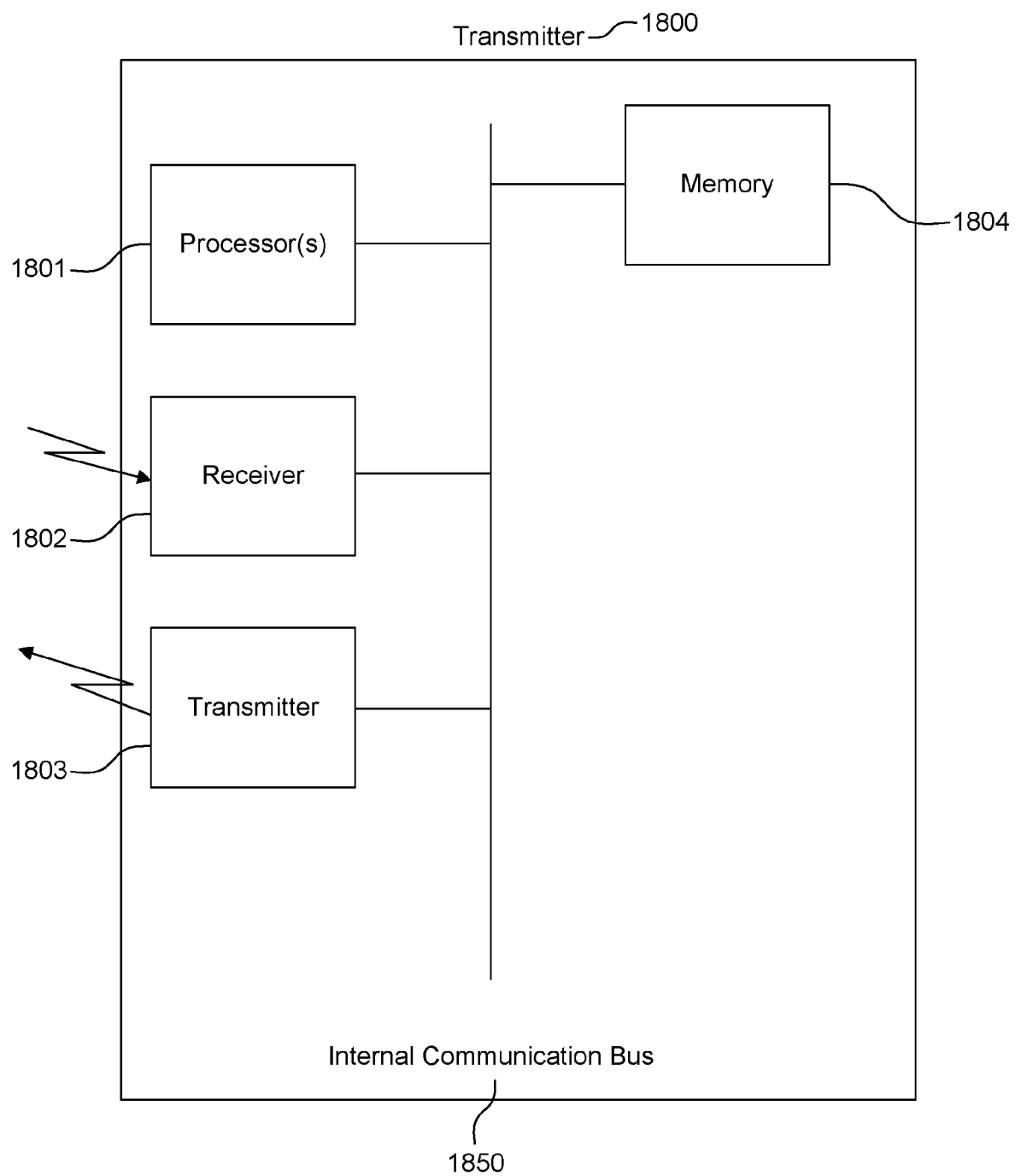
FIG. 18 is an embodiment of a transmitter device.

FIG. 18 is a transmitter device 1800 (or, e.g., 400) according to an embodiment for transmission radio signals between the transmitter device and a wireless transmit-receive unit, WTRU (e.g., 402, 1900), using a Reconfigurable Intelligent Surface device, RIS (e.g., 401, 1700). The RIS device comprises a matrix of unit cells, each unit cell having a different preconfigured phase setting of a reflection factor for reflecting the radio signals, and each unit cell being configurable to be selected or to be not selected, a selection corresponding to a high radio signal reflection amplitude and a non-selection corresponding to a low radio signal reflection amplitude lower than the high reflection amplitude.

The transmitter device 1800 comprises at least one processor 1801 and a transmitter 1803, and possibly a memory 1804 e.g., for storing of configuration information. Each of the elements 1801-1804 are interconnected via an internal communication bus 1850.

The at least one processor 1801 is configured to select a subset of unit cells of the RIS device that contribute to receipt, by the WTRU, of at least one radio channel transmitted from the transmitter device to the WTRU when the WTRU is located in a given area where the WTRU receives the radio channel directly from the transmitter device and indirectly from the transmitter device via the RIS device, by selecting a subset of unit cells that result in a least delay of the radio channel indirectly received by the WTRU from the transmitter via the RIS device compared against the radio channel directly received by the WTRU from the transmitter device.

The transmitter 1803 is configured to transmit the selected subset of unit cells to the RIS device.

According to a further embodiment of the transmitter device 1800, the transmitter 1803 is further configured to transmit the selected subset of unit cells to the RIS device as information representative of cell selection of RIS unit cells.

According to a further embodiment of the transmitter device 1800, the transmitter 1803 is further configured to transmit the information representative of unit cell selection of RIS unit cells over a control channel for configuring the RIS device.

According to a further embodiment of the transmitter device 1800, the at least one processor 1801 is further configured to put the information representative of unit cell selection in the form of a bitmap being a representation of the unit cells, and a value for each bit in the bitmap corresponding to a reflection amplitude to be configured for the corresponding unit cell, the value comprising a first value for low reflection amplitude when the corresponding unit cell is not selected, and a second value different from the first value for high reflection amplitude when the corresponding unit cell is selected.

According to a further embodiment of the transmitter device 1800, the at least one processor 1801 is further configured to put the information representative of unit cell selection in the form a list of indices, the indices indicating, for selected unit cells of which high reflection amplitude is desired, while low reflection amplitude is desired for indices of not selected unit cells, not in the list.

According to a further embodiment of the transmitter device 1800, the transmitter device further comprises a receiver 1802, configured to receive, from the WTRU, a RIS unit cell subset selection performed by the WTRU for assisting the transmitter device in selecting a subset of unit cells of the RIS device, wherein the WTRU RIS unit cell subset selection is based on information available to the WTRU about phase settings of the RIS unit cells and about channel information relating to a channel (e.g., h2) between the transmitter device and the RIS device and relating to a channel (e.g., h3) between the RIS device and the WTRU.

According to a further embodiment of the transmitter device 1800, the receiver 1802 is further configured to receive the RIS unit cell subset selection performed by the WTRU in a Channel Status Information report.

Figure 19:
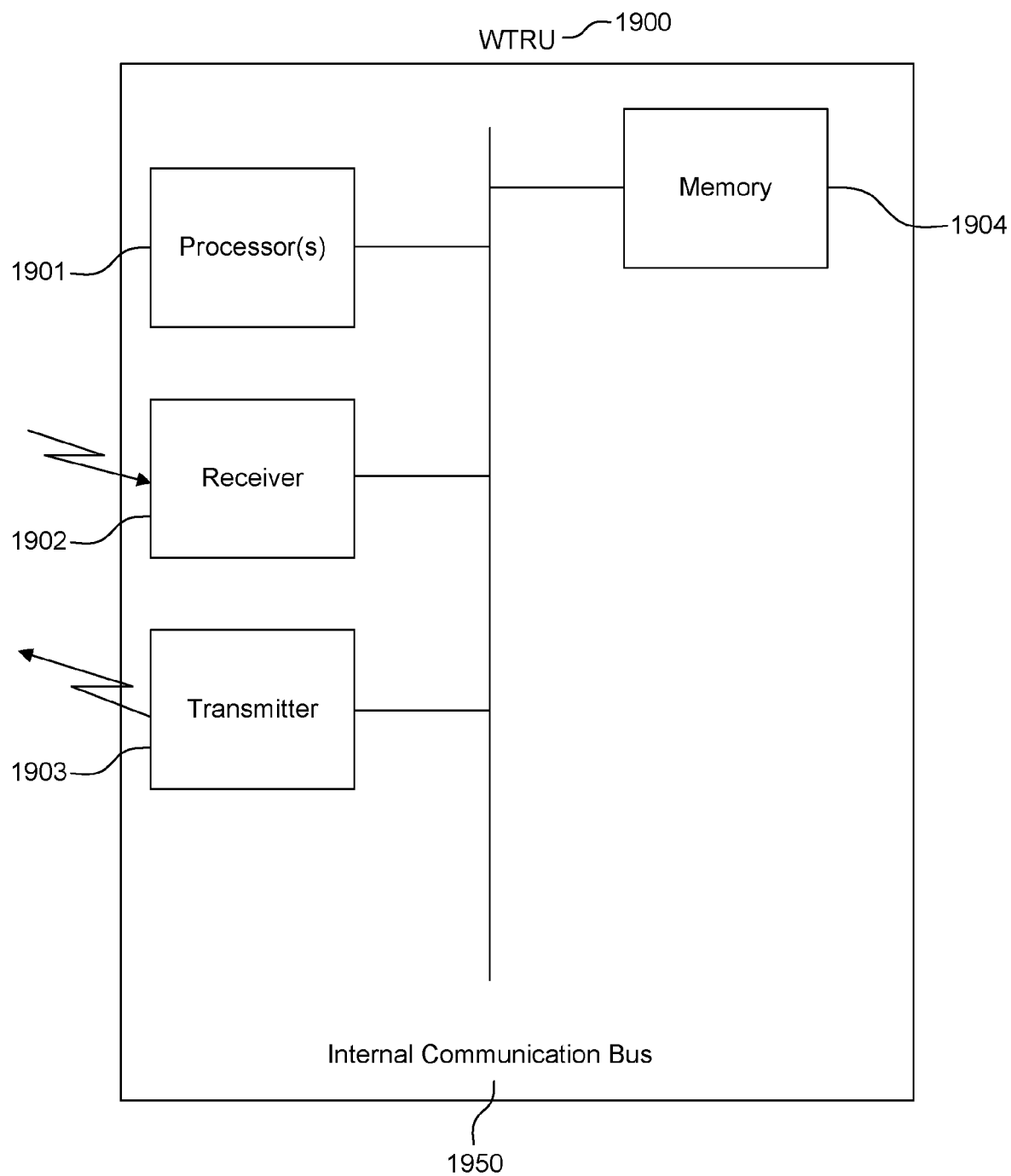
FIG. 19 is an embodiment of a WTRU.

FIG. 19 is a WTRU 1900 (or, e.g., 402) according to an embodiment for receiving radio signals from a transmitter device (e.g., 400, 1800) using a Reconfigurable Intelligent Surface device, RIS device (401, 1700). The WTRU comprises at least one processor 1901, a receiver 1902, a transmitter 1903, and a memory 1904. Each of the elements 1901-1904 are connected to an internal communication bus 1950.

The receiver 1902 is configured to receive a channel (e.g., h1) directly from the transmitter device.

The receiver 1902 is further configured to receive the same channel (e.g., h2,h3) indirectly from the transmitter device via the RIS device, the RIS device comprising a matrix of unit cells, each unit cell being configured to have a different preconfigured phase setting of a reflection factor for reflecting the radio signals, and each unit cell being configurable to be selected or to be not selected, a selection corresponding to a high radio signal reflection amplitude and a non-selection corresponding to a low radio signal reflection amplitude lower than the high reflection amplitude.

The at least one processor 1901 is configured to assist the transmitter device in selecting a subset of RIS unit cells from a collection of subsets identified to the WTRU, the unit cell subset selection being based on information available to the WTRU about phase settings of the RIS unit cells and about channel information relating to the channel (h2) between the transmitter device and the RIS device and relating to a channel (h3) between the RIS device and the WTRU.

The transmitter 1903 is configured to transmit the unit cell subset selection to the transmitter device.

According to a further embodiment of the WTRU, the transmitter 1903 is further configured to transmit the unit cell subset selection to the transmitter device in a Channel Status Information report.

Compression of Channel Status Information (CSI) Feedback in RIS-Based Transmission (for Feedback Reduction)

System Model

A gNB equipped with M number of transmit antennas is used to serve k number of users. For the sake of simplicity, hereafter, it is assumed that each user has a single receive antenna. However, the embodiments proposed here for feedback reduction are equally applicable to users with multiple receive antennas. A reconfigurable intelligent surface (RIS) with N reflecting elements (REs) (or unit cells) is deployed in the vicinity to assist the communications between the gNB and the users.

For a multiple user scenario, modifying Eq. (2), the received signal at the $k_{th}$ user with single receive antenna may be expressed as:

$$y_k = (h_{1,k}^T + h_{3,k}^T \Phi H_2)x + w_k \quad \text{Eq. 10}$$

where the path-loss terms $\sqrt{\beta_{RIS}}$ and $\sqrt{\beta_{TxRx}}$ are ignored for the sake of simplicity. However, the embodiments listed here for feedback reduction are equally applicable when considering the path-loss terms and when users have multiple receive antennas. Moreover, $x \in \mathbb{C}^{1 \times M}$ is the precoded message signal transmitted by the gNB, $h_{1,k}$ is the channel gain between the gNB and the $k_{th}$ user via the direct path, $h_{3,k}$ is the channel gain between the RIS and the $k_{th}$ users, and $H_2 \in \mathbb{C}^{N \times M}$ is the channel between the gNB and the RIS. The additive white Gaussian noise (AWGN) is denoted by $w_k$, which follows complex Gaussian distribution with zero mean and $\sigma^2$ variance. Each element of the RIS provides a phase shift to the impinging electromagnetic signal. The RIS provides N number of phase shift. The phase shift matrix is denoted by $\Phi \in \mathbb{C}^{N \times N}$, which is a diagonal matrix whose diagonal entries are given as follows:

$$\Phi = \text{diag}(p^T) = \text{diag}(\Gamma_1, \Gamma_2, \ldots, \Gamma_N) \quad \text{Eq. 11}$$

where $p^T = \Gamma_1, \Gamma_2, \ldots, \Gamma_N$, $\Gamma_N = \Gamma e^{j\varphi_n}$, $\Gamma=1$ corresponds to the full reflection of the $n_{th}$ RE and $\Gamma=0$ corresponds to the full reflection of the $n_{th}$ RE. Moreover, $\varphi_n \in [0, 2\pi]$ and $n=1, \ldots, N$.

Methods of CSI Feedback for the RIS Cascaded Channel

The cascaded channel ($h_3$ of FIG. 2), i.e., gNB-RIS-WTRU may be denoted as $h_{3,k}^T \Phi H_2$, which can be transformed using the diagonal matrix property as follows:

$$h_{3,k}^T \Phi H_2 = p^T \text{diag}(h_{3,k}^T) H_2 \quad \text{Eq. 12}$$

Figure 20:
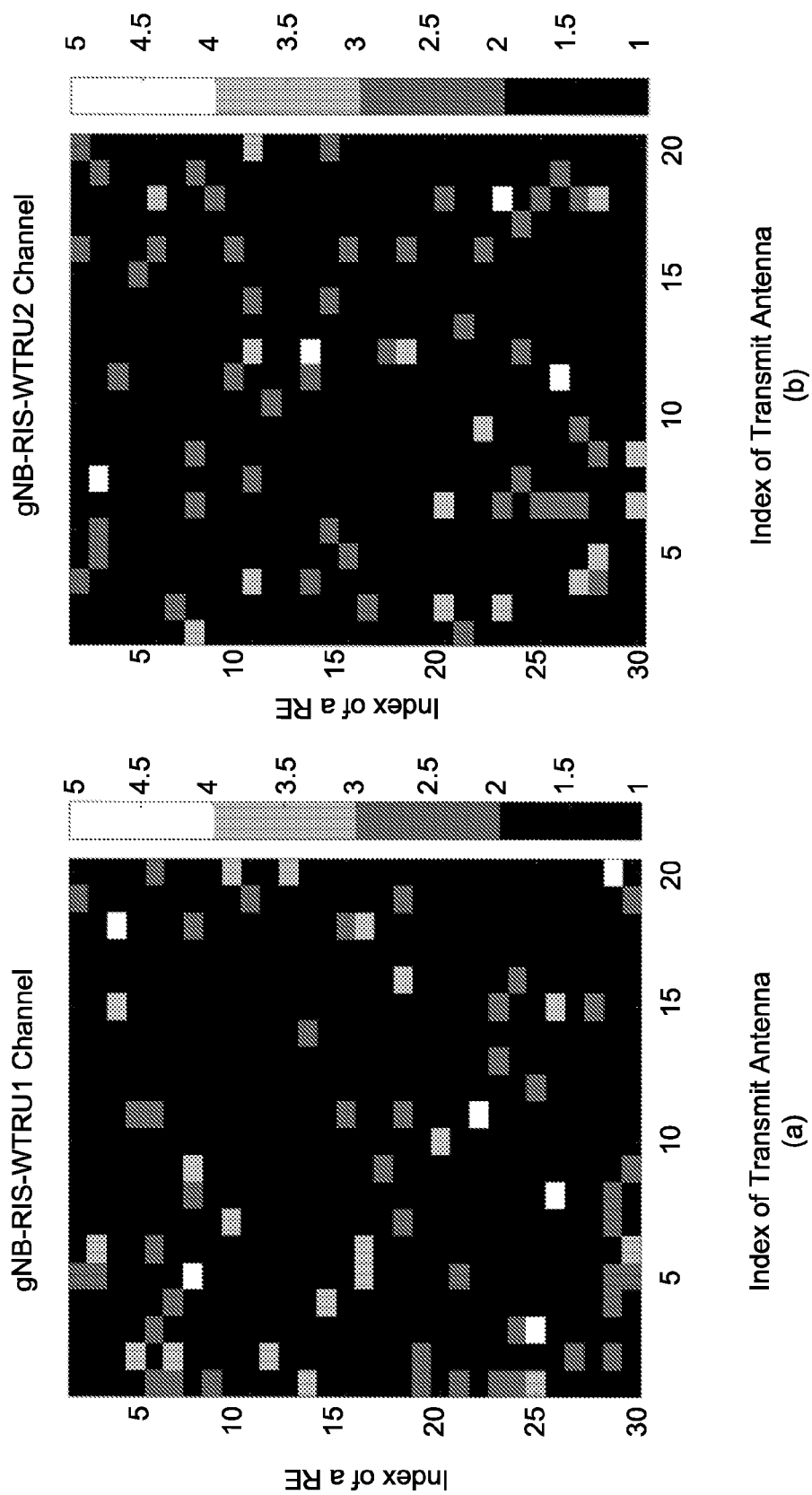
FIG. 20 is an illustration of cascaded gNB-RIS-WTRU channel based on Eq. (13) for two different users.

Based on Eq (12), the cascaded channel, i.e., gNB-RIS-WTRUK can be approximated as:

$$H_c \triangleq \text{diag}(h_{3,k}^T) H_2 \quad \text{Eq. 13}$$

where $H_c$ denotes the cascaded channel. Observe that $H_c \in \mathbb{C}^{N \times M}$, where M is the number of transmit antennas at the gNB and N is the number of REs. FIG. 20 depicts the reflection coefficient of each unit cell in the form of a heatmap, where dark colors indicate zero to little reflection, whereas grey and white colors indicate moderate and high reflection, respectively; a reflection coefficient scale of 1 to 5 (the values 1 to 5 are arbitrarily chosen) is indicated (1=zero to little reflection, 5=high reflection), the cascaded channel matrix in Eq (13) for two different users, i.e., WTRU1 (FIG. 20a) and WTRU2 (FIG. 20b) when using N=30 REs (RE index on the y-axis) on RIS and M=20 transmit antennas at gNB (on the x-axis). Reporting CSI from the WTRU to the gNB in a form as shown in FIG. 20(a) for WTRU1 and FIG. 20(b) for WTRU2 will result in a significant overhead. The overall feedback is a function of the number of transmit antennas M, the number of REs N, the number of users K, and the number of transmit antennas per user. To reduce the overhead, one naïve strategy would be to send indexes and values of the unit cells having higher values on the heatmap (non-black (blue) unit cells). However, this solution is still expensive in terms of overhead. Therefore, sparsity in the cascaded gNB-RIS-WTRU channel is exploited for the sake of feedback reduction in the following section.

Sparsity of the gNB-RIS-UE Cascaded Channel

In practice, gNB and RIS are surrounded by limited number of scatterers. Therefore, there are only limited number of angle of departures (AoDs) at gNB, and limited number angle of arrivals (AoAs) at RIS. From the heat intensity of each unit cell in FIG. 20a and FIG. 20b, it can be inferred that there are only a few dominant paths from the gNB to the WTRU. In other words, both the exemplary cascaded channel matrices in FIG. 20a and FIG. 20b looks sparse (a sparse matrix is a matrix in which most elements are zero (here indicated by black unit cells) because most unit cells are black (i.e., do not contribute to improvement of the signal received by the WTRU).

Sparse coding maybe used to find a sparse representation of the cascaded gNB-RIS-WTRU channel. It could be interesting to denote the cascaded channel matrix given in Eq (13) by as few columns as possible. Predefined dictionaries such as Fourier transform, or wavelet transform can be used to obtain an alternative representation of Eq (13) with fewer columns. Dictionary learning, where the dictionary matrix is inferred from input data can be used to obtain an alternative representation of Eq (13) with fewer significant columns as compared to when using Fourier or wavelet dictionaries.

At the WTRU, given $H_z$, $z=[c, a]$, where the subscript c points to the cascaded channel and the subscript a point to the aggregated channel. The aggregated channel is discussed in the following section. It is desired to find a matrix $D_c \in \mathbb{C}^{N \times N}$ also known as a dictionary matrix, and an alternative representation of $H_c$ with fewer non-zero columns, denoted by $R_c \in \mathbb{C}^{N \times M}$, such $\|H_c - D_c R_c\|^2$ is minimized under the constraint that the matrix $R_c$ is sparse enough. The optimization problem is non-convex. However, several algorithms including matching pursuit and LASSO may be used for solving the problem with decent complexity. Using any of the mentioned algorithms, Eq (13) can be rewritten as:

$$H_c \triangleq D_c R_c \qquad \text{Eq. 14}$$

The angular resolution of the dictionary matrix is set as $D_c \in \mathbb{C}^{N \times Q}$, which means that the range of the channel angles are divided into Q grids. Particularly, the AoDs at the gNB is denoted by Q number of grids. When Q=M, the dictionary matrix $D_c$ becomes a M×M discrete Fourier transformation matrix. Therefore, $H_c$ in the column dimension is converted to angular domain by spatial DFT, and $H_c$ in the row dimension is in spatial domain. Moreover, note that there are L≤Q number of non-zero columns in $H_c$, where L denotes the number of paths between the gNB and the WTRU.

CSI Feedback Structure

Figure 21:
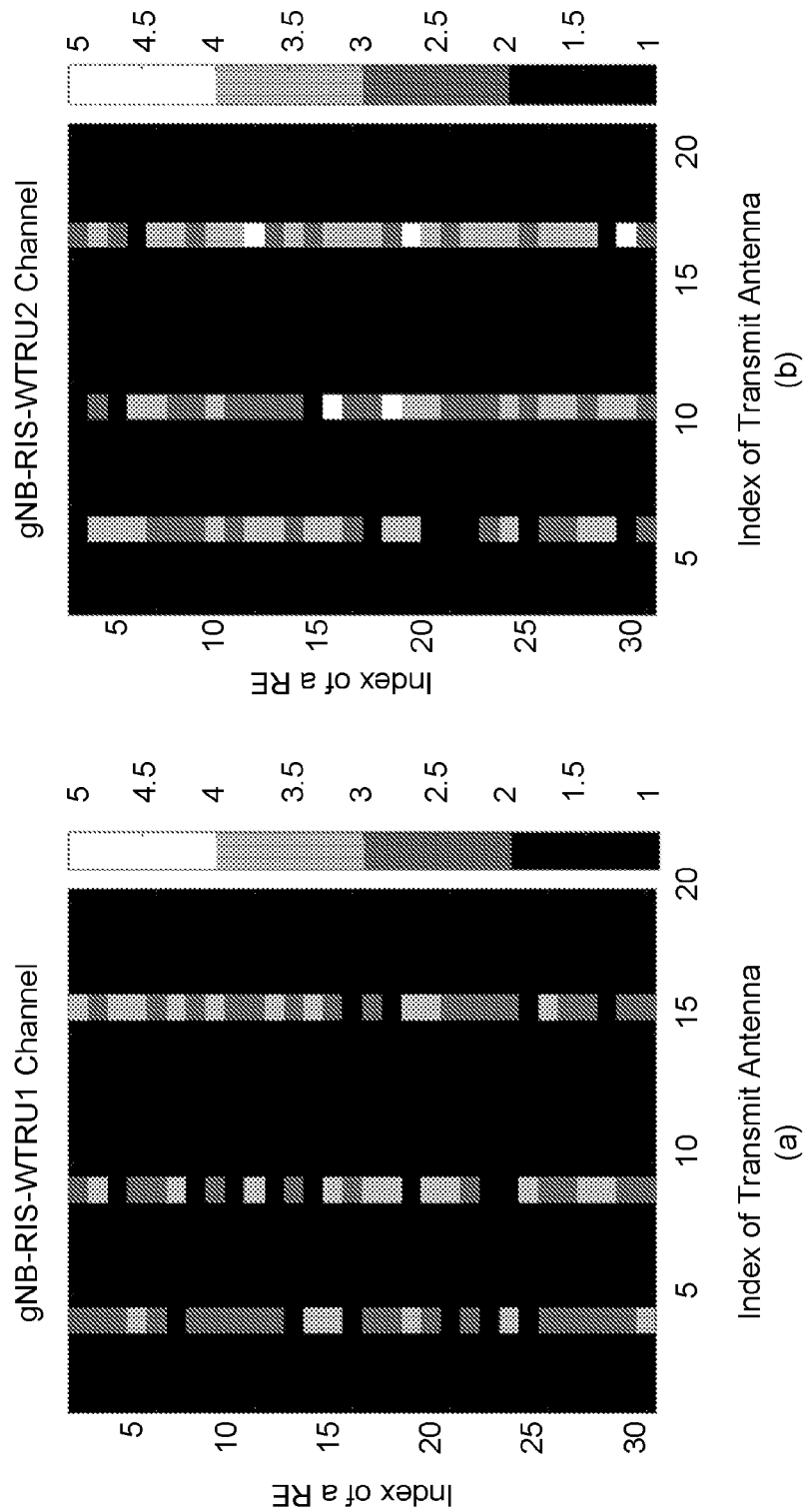
FIG. 21 is an illustration of cascaded gNB-RIS-WTRU channel based on $R_c$ in Eq. (14) for two different users.

FIG. 21 depicts a graphical illustration of the alternative representation of $H_c$ denoted by $R_c$. Here, note that all users share the same non-zero columns in $R_c$, which can be exploited for CSI feedback overhead reduction. Reporting of the $R_c$ is a two-phase process. Let $R_{i,m}$ denotes the value in $R_c$ on its $i_{th}$, i=1, ... N row and $m_{th}$, m=1, ..., M column, where only L<M number of columns are non-zero and the rest of the columns are all zero. Let L be the set denoting the indices of all non-zero columns and l∈L, where l is common for all K users.

In the first phase, indices of the non-zero columns of $R_c$ denoted by L are reported to the gNB. As mentioned earlier, L is common to all users. Therefore, a single user or a few users can report L back to the gNB. When multiple users are reporting the set of non-zero columns' indices L, a majority-based rule at the gNB maybe adopted for the sake of error detection in the reporting process. In the second phase, each user reports the non-zero values in $R_{i,l \in L}$. Note that the first phase of the reporting process, i.e., reporting L is common in all of the following methods. In particular, the following embodiments focus on reporting $R_{i,l \in L}$, for all i=1, ... N.

Embodiment 1: In this embodiment, $R_{i,l \in L}$ for all i, is reported back to the gNB. In embodiment 1, only N×L reports are required to send, $R_{i,l \in L}$ back to gNB, whereas N×M reports are required when reporting $H_c$. Therefore, the overall overhead of reporting $R_{i,l \in L}$ using embodiment 1 is smaller than when reporting $H_c$. Then, using $D_c$, and the reported $R_c$, the gNB can estimate $H_c$. The estimation of $H_c$ from $D_c$, and the reported R, is common in all the following embodiments.

Embodiment 2: In this embodiment, instead of reporting all entries of the non-zero columns to the gNB, only a set of values based on a pre-defined threshold are reported back to the gNB. For instance, assume a threshold γ. Now, let $R_{i,l \in L}$ denoted the $i_{th}$ value for i=1, ... N of the lth non-zero column, where l=1, ..., L. For all $R_{i,l \in L}$>γ, the index i, and the value $R_{i,l \in L}$ is reported to the gNB. Note, that l∈L was already reported in the first phase. This embodiment can further reduce the overhead. In particular, the choice of γ offers a good tradeoff in terms of performance, overhead and complexity.

Embodiment 2 may have some limitations. For instance, using embodiment 2, $R_{i,l \in L}$ in row-domain i for a given user may be reported in different sizes. For instance, for l=1, 0≤j1≤N, reports maybe send to the gNB, whereas for l=2, 0≤j2≤N, with j1+j2 can be reported. In which case, the scheduler may choose the sizes of j1 and j2 while considering reports from other users and treating the remaining entries of the column l as zero. This limitation of embodiment 2 motivates the following embodiment.

Embodiment 3: Instead of comparing the entries of $R_{i,l \in L}$ to a threshold for reporting, the first j1 maximum entries in $R_{i,l \in L}$ for each I are reported.

Embodiment 4: In practice, some degree of correlation exists between the closely spaced REs of RIS. Such correlation exists in $H_c$ which can be equally observed and exploited in $R_c$ among the entries of each dominant columns. Such correlation can be exploited for further feedback reduction. For instance, consecutive equal elements of a given $R_{i,l \in L}$ in a given column I may have some degree of correlation. The indexes of such chunks of correlated REs and the values of such chunks can be reported with reduced overhead. Particularly, two type of reporting processes with different overhead may be adopted here:

1. The WTRU feedbacks the indexes of the chunks and the exact values of the chunks. The WTRU may only report information of a single or multiple chunks with higher values. Among several correlated chunks, the WTRU may report all or a few dominant chunks.
2. The WTRU feedbacks the indexes of the chunks and the mean value of each chunk instead of the exact value of each RE. The WTRU may only report information of a chunk with the maximum mean value. The WTRU may report all or a few dominant chunks.

Methods of CSI Feedback for the RIS Aggregated Channel

The aggregated channel, i.e., the joint gNB-WTRU and the gNB-RIS-WTRU ($h_1$ and $h_3$ of FIG. 2) can be expressed as:

$$h_{1,k}^T + h_{3,k}^T \Phi H_2 \qquad \text{Eq. 15}$$

Following the transformation used in obtaining Eq (13), the above equation can be expressed as $$H_a = \text{diag}(h_{1,k}^T) + \text{diag}(h_{3,k}^T) H_2 \qquad \text{Eq. 16}$$

where $H_a \in \mathbb{C}^{N \times M}$ is the so-called aggregate channel and $\text{diag}(h_{1,k}^T) \in \mathbb{C}^M$, with $h_{1,k}^T \in \mathbb{C}^{N \times M}$, and $h_{1,k}^T$ are the elements on the principal diagonal of $\text{diag}(h_{1,k}^T) \in \mathbb{C}^{N \times M}$.

The aggregated channel $H_a$ can be shown to have a similar structure for different users as shown in FIG. 20(a) and FIG. 20(b). Similarly, sparsity of the aggregated channel $H_a$ can be expressed in terms of dictionary matrix $D_a$, and alternative representation of $H_a$, here denoted by $R_a$. Thus, the aggregated channel can be expressed as:

$$H_a = D_a R_a \qquad \text{Eq. 17}$$

It can be shown that the alternative representation $R_a$ of the aggregated channel $H_a$ has a similar structure as shown in FIG. 21(a) and FIG. 21(b) for different users.

CSI Feedback Structure

Similar to section "Methods of CSI feedback for the RIS cascaded channel", first indexes of the non-zero columns of $R_a$ are reported to the gNB. Apart from that, the following embodiments are considered for the reporting the values of the non-zero columns.

The four embodiments for reporting the values of the non-zero columns of $R_c$ mentioned in Section "Methods of CSI feedback for the RIS cascaded channel" are equally applicable for the reporting of $R_a$. The following additional embodiments may be considered.

Before listing the embodiments under discussion, note that the aggregated channel knowledge $H_a$ at the transmitter is required for the purpose of precoding and RE selection at RIS.

Embodiment 5: based on the aggregated channel $H_a$, the gNB may only report all index(es) of columns (index(es) of transmit antenna(s)) and all index(es) of rows (index(es) of REs) which leads to better co-phasing at the WTRU. The WTRU may only report all index(es) of columns and rows, or the WTRU may only report index(es) of columns and rows with better channel gain and which leads to better co-phasing at the WTRU. Using this embodiment, fixed phases may be defined for the REs. The overhead required to report only the column and row index(es) between the WTRU and the gNB and between the gNB and RIS and/or between the WTRU and gNB is smaller.

Embodiment 6: the WTRU may report full values of the non-zero columns to the gNB or the WTRU may report the values of the non-zero columns as per Embodiments 1, 2, 3, and embodiment 4 given in "Methods of CSI feedback for the RIS cascaded channel" for the purpose of precoding. For the purpose of RE/unit cell selection as detailed in section "Nearly Passive Reconfigurable Intelligent Surface with Constant Phase-shifts", the WTRU or the gNB may report full values of angle information for all N RE or the WTRU or gNB may only report index(es) of rows to the RIS as per embodiment 1, embodiment 2, embodiment 3 or embodiment 4 for REs selection as detailed in section "Nearly Passive Reconfigurable Intelligent Surface with Constant Phase-shifts".

Embodiment 7: index(es) of the correlated elements of the non-zero columns which can help in co-phasing at the WTRU may be reported to the gNB and/or RIS along with other reports of embodiments 1-5. Reporting of a row index(es) of $H_a$ specifies the index of a RE on RIS. Only reporting index(es) of correlated rows which can help in co-phasing can significantly reduce overhead between WTRU and gNB, gNB and RIS and/or WTRU and RIS.

Exemplary Procedure for Quantization and CSI Reporting

According to an embodiment, a WTRU may be configured with a set of reference matrices $D=\{D_0\ D_1\ \ldots\}$ that may be used for quantization of channel of an RIS-based transmission system. Alternatively, a WTRU may determine and indicate a set of reference matrices to the gNB. The set of reference matrices may be considered as a codebook.

A WTRU may estimate the channel H, based on the configured reference signals, e.g., for channel estimation. The estimated channel may be only the channel through the RIS reflection or aggregated channel where the aggregated channel is the channel composed of the direct and RIS channels.

According to an embodiment, a WTRU may decompose and quantize the estimated channel by $H \triangleq DR$ transformation by using the available reference codebook D. In other words, the WTRU may decompose and quantize the estimated channel using sparse dictionary learning by using the available reference codebook D. The result of the quantization process that is captured in R may be composed of several related components.

According to an embodiment, a WTRU may report one or more of the followings in its CSI report,
  Index i of the reference matrix $D_i$, that was used for quantization of the channel,
  Indication of matrix R
    Reporting elements of matrix R,
      All elements of matrix R that meet a configured threshold, e.g., above or below,
        According to an embodiment, a WTRU may receive the required number of elements for reporting, i.e., an exact, a min or a max number,
      x strongest or weakest elements of the matrix R, where x is a configurable value
    Reporting columns (rows) of matrix R,
      Indices of the columns (rows) of the matrix R that their powers meet a configured threshold, i.e., above or below,
        According to an embodiment, a WTRU may receive the required number of columns (rows) for reporting, i.e., an exact, a min or a max number,
      All elements of the indicated vectors (rows) that meet a configured threshold, i.e., above or below,
        According to an embodiment, a WTRU may receive the required number of elements for reporting, i.e., an exact, a min or a max number,
      x strongest or weakest elements of the indicated vectors (rows), where x is a configurable value
    For reporting of each element, power, phase or both information may be included,
      The power report may be based on the actual power, or alternatively a quantized version of it may be used, where the quantization may be based on one bit quantization. Similarly, phase information may be quantized and indicated.
    A WTRU may reduce one or more dimensions, e.g., columns/rows, of matrix R to get R', and then perform the above reporting on R',
      The reduction of dimension may be by decimation or averaging of every m subject, e.g., column, row, element, etc.

Figure 22:
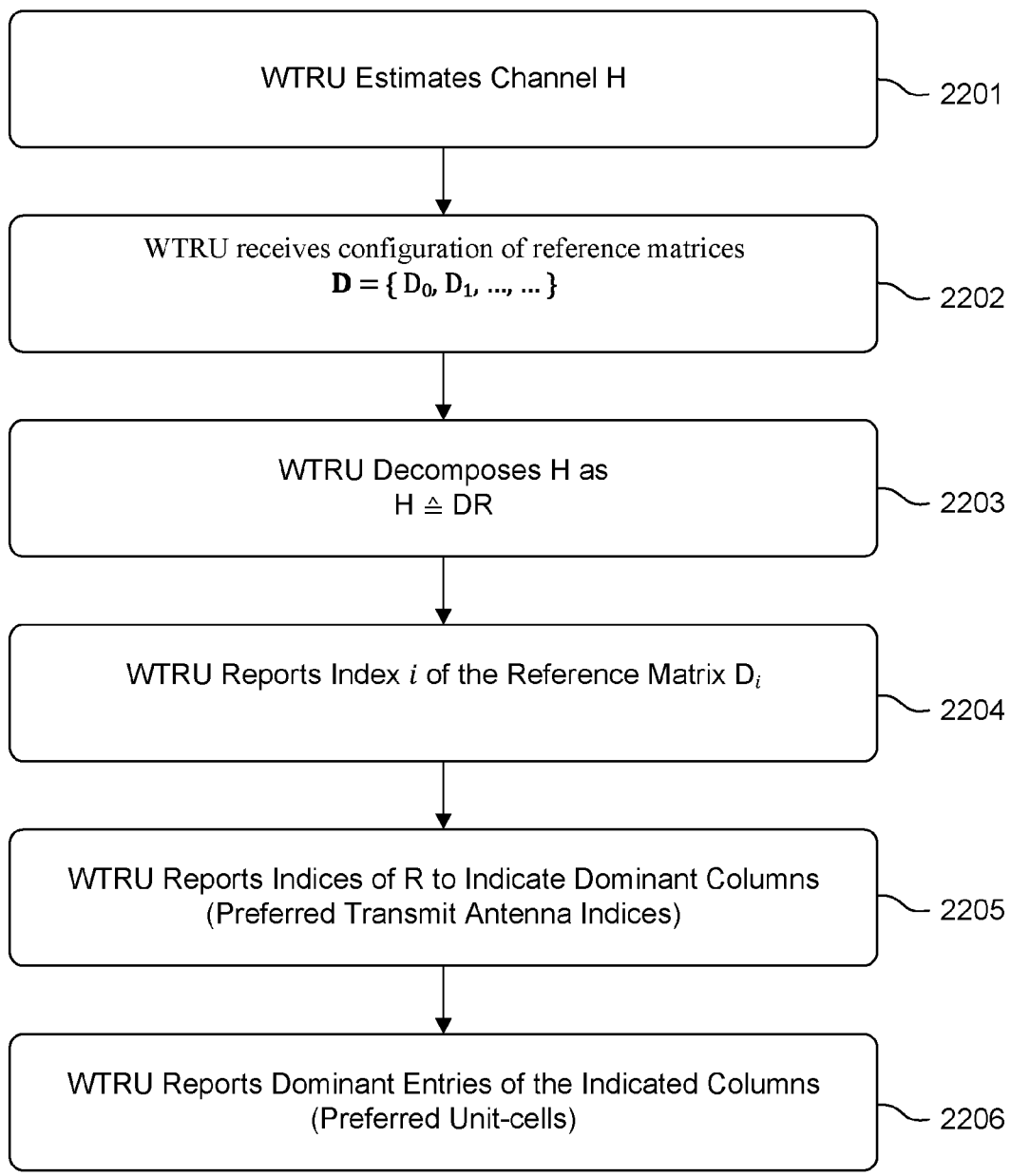
FIG. 22 is a flow chart of a method for compression of Channel Status Information (CSI) feedback in RIS-based transmission according to an embodiment.

FIG. 22 is a flow chart of a method for compression of Channel Status Information (CSI) feedback in RIS-based transmission according to an embodiment. The method may be implemented by a WTRU, for example, WTRU 202 of FIG. 2. In 2201, the WTRU estimates the channel H. The estimated channel may be only the channel through the RIS reflection (FIG. 2: h3) or aggregated channel (FIG. 2: h1+h3) where the aggregated channel is the channel composed of the direct (h1) and RIS channels (h3). The channel H estimate is based on the configured reference signals, see the first and the second paragraph of section "Exemplary procedure for quantization and CSI reporting" (this section). In 2202, the WTRU receives a configuration of the reference matrices $D=\{D\_0, D\_1, \ldots\}$, and in 2203, the WTRU decomposes H as $H \triangleq DR$, see the third paragraph of this section. In 2204, the WRTU reports index i of the reference matrix $D_i$, that was used for quantization of the channel, see the first and the fourth paragraph of this section. In 2205, the WTRU reports indices of R to indicate dominant columns (preferred transmit antenna indices) as per the second paragraph of section "CSI feedback structure". In 2206, WTRU reports dominant entries of the indicated columns (preferred unit-cells) as per the fourth paragraph of this section.

The flowchart in FIG. 22 depicts a high level method for quantization of CSI and its reporting according to an embodiment. The procedure depicted in FIG. 22 can be used for both cascaded as well as the aggregated channel. The working principles are listed as follows. First, the WTRU estimates the cascaded and/or the aggregated channel (2201). Then, the WTRU receives (2202) a configuration of references matrices D={$D_0$ $D_1$ ... }. Then, the WTRU chooses a reference matrix $D_i$ from D as per the criteria listed in the second paragraph, the third paragraph, and the last paragraph of section "Sparsity of the gNB-RIS-UE cascaded channel", respectively. Then, the WTRU decomposes (2203) the cascaded channel as per Eq. (14) and the aggregated channel as per Eq. (17). In the next step (2204), the WTRU reports the index i of the reference matrix $D_i$ as per the first paragraph of this section and the fourth paragraph of this section. Next, the WTRU reports (2205) indices of R to indicate the dominant columns based on the procedure listed in the second paragraph of section "CSI feedback structure". The dominants columns indices of R corresponds to the preferred antenna indices at transmitter. Finally, the WTRU reports (2206) the dominant entries of the chosen columns in the previous step according to the procedures listed in the fourth paragraph of this section. Such dominant entries of the indicated columns corresponds to the preferred unit-cells on RIS.

Figure 23:
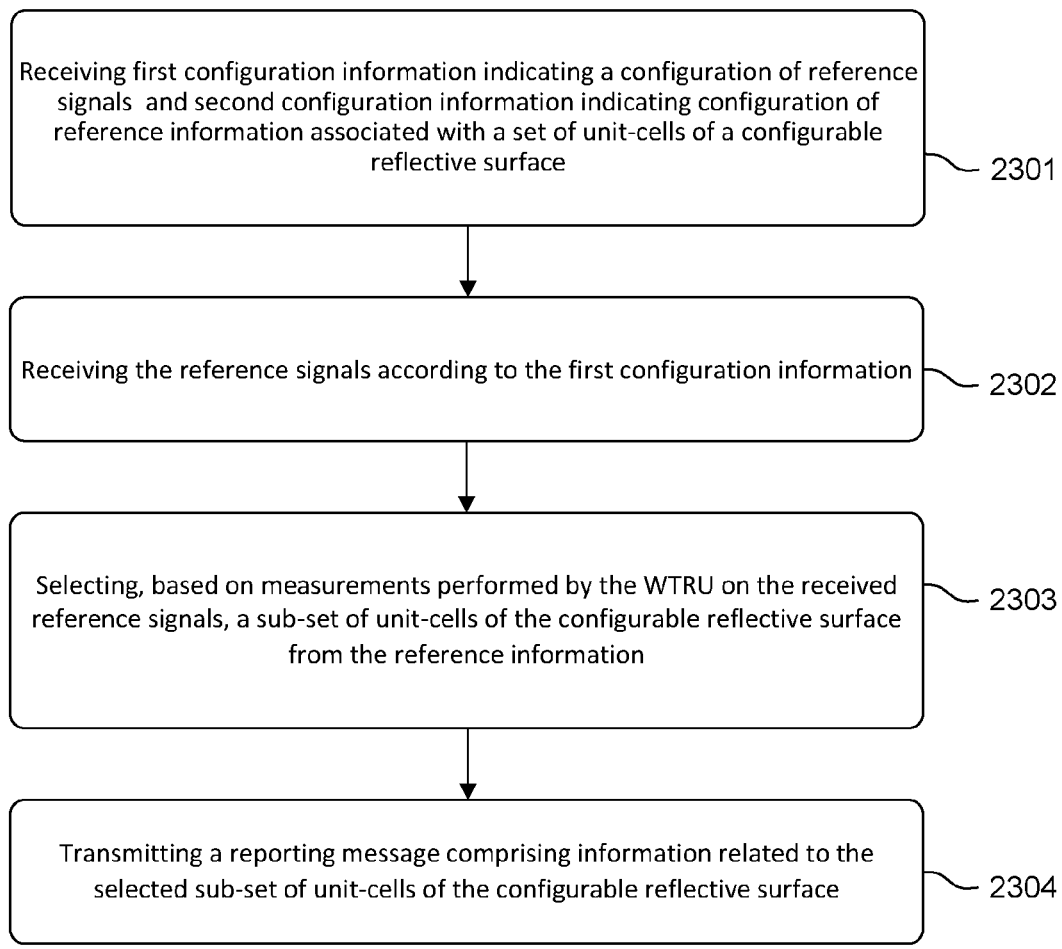
FIG. 23 is a flow chart of a method according to an embodiment.

FIG. 23 is a flow chart of a method implemented in a wireless transmit-receive unit (WTRU), according to an embodiment. In 2301, first and second configuration information is received. The first configuration information indicates a configuration of reference signals. The first configuration may be in the form of a single configuration for multiple reference signals, or in the form of multiple first configuration information per reference signal. The second configuration information indicates configuration of reference information (e.g., matrices) associated with a set of unit-cells of a configurable reflective surface (RIS). In 2302, the reference signals are received according to the first configuration information. In 2303, a sub-set of unit-cells of the configurable reflective surface is selected from the reference information, the selection being based on measurements performed by the WTRU on the received reference signals. In 2304, a reporting message is transmitted (a report is transmitted), the reporting message (the report) comprising information related to the selected sub-set of unit-cells of the configurable reflective surface.

According to an embodiment, after the transmitting the reporting message (the report), at least one of the reference signals is received with a higher energy level (or channel gain) at reception than an energy level (or channel gain) at reception before transmitting the reporting message (the report).

According to an embodiment, the reference information comprises indications of reference matrices associated with a set of unit-cells of the configurable reflective surface.

According to an embodiment, the reporting message (report) comprises indication information of a selected reference matrix of reference matrices associated with the selected sub-set of unit-cells of the configurable reflective surface.

According to an embodiment, the reporting message (the report) further comprises information indicating at least one column of the selected reference matrix.

According to an embodiment, the reporting message (the report) further comprises information indicating at least one entry in the indicated at least one column.

According to an embodiment, the reporting message (the report) indicates a desired reflection for selected unit cells of the configurable reflective surface, and a desired non-reflection for non-selected unit-cells of the configurable reflective surface.

According to an embodiment, the reporting message (the report) is transmitted over a control channel transmission.

According to an embodiment, the reporting message (the report) is transmitted in a channel status information report.

According to an embodiment, there is also disclosed a wireless transmit-receive unit, WTRU, device, the WTRU device. The WTRU device comprises at least one processor. The at least one processor is configured to receive first configuration information indicating a configuration of reference signals and to receive second configuration information indicating configuration of reference information associated with a set of unit-cells of a configurable reflective surface. The at least one processor is further configured to receive the reference signals according to the first configuration information. The at least one processor is further configured to select, based on measurements performed by the WTRU device on the received reference signals, a sub-set of unit-cells of the configurable reflective surface from the reference information. The at least one processor is further configured to transmit a reporting message comprising information related to the selected sub-set of unit-cells of the configurable reflective surface.

According to an embodiment of the WTRU device, the at least one processor is further configured to receive, after the transmitting the reporting message, at least one of the reference signals with a higher energy level at reception than an energy level at reception before transmitting the reporting message.

According to an embodiment of the WTRU device, the reference information comprises indications of reference matrices associated with a set of unit-cells of the configurable reflective surface.

According to an embodiment of the WTRU device, the at least one processor is further configured to include, in the reporting message, indication information of a selected reference matrix of reference matrices associated with the selected sub-set of unit-cells of the configurable reflective surface.

According to an embodiment of the WTRU device, the at least one processor is further configured to include, in the reporting message, information indicating at least one column of the selected reference matrix.

According to an embodiment of the WTRU device, the at least one processor is further configured to include, in the reporting message, information indicating at least one entry in the indicated at least one column.

According to an embodiment of the WTRU device, the reporting message indicates a desired reflection for selected unit cells of the configurable reflective surface, and a desired non-reflection for non-selected unit-cells of the configurable reflective surface.

According to an embodiment of the WTRU device, the at least one processor is further configured to transmit the reporting message over a control channel transmission.

According to an embodiment of the WTRU device, the at least one processor is further configured to transmit the reporting message in a channel status information report.

REMARKS

Signalling overhead when reporting CSI is a major issue in RIS assisted wireless communication systems. The large number of RE of RIS makes the reporting and related overhead a very expensive process. To reduce the overhead of CSI reporting, a channel sparsity based method is introduced. In a nutshell, a method for the CSI reporting of the cascaded gNB-RIS-WTRU channel and aggregated gNB-WTRU and gNB-RIS-WTRU channel is proposed with the aim of reducing the required overhead. The CSI reporting method may also be applicable to massive multiple input multiple output (MIMO) systems.

An RIS-based system using an NP-RIS structure according to embodiments with a simple unit cell selection method has been described. One of the unique features of an NP-RIS according to embodiments is that instead of using phase shifters, the NP-RIS structure according to embodiments is made of unit cells with a randomly fixed phase value.

Based on the presented results, an NP-RIS system according to embodiments with 400 total unit cells and 100 selected unit cells can approach a similar performance as of a conventional RIS with 100 unit cells and full phase adjustments. It has been shown that by using an NP-RIS according to embodiments, a same level of performance may be achieved as with a conventional RIS, without requiring any phase adjustment. In fact, by use of an NP-RIS and unit cell selection according to embodiments, it is possible to alleviate the complexities related to the phase shifter network, while at the same time reducing associated control signaling without any performance loss. It may further be pointed out that employing a larger number of unit cells in an NP-RIS is not an issue because the sub-wavelength size of unit cells helps an easy integration and deployment of such surfaces.

CONCLUSION

While not explicitly described, the present embodiments may be employed in any combination or sub-combination. For example, the present principles are not limited to the described variants, and any arrangement of variants and embodiments can be used. Moreover, the present principles are not limited to the described channel access methods and any other type of channel access methods with different priority levels is compatible with the present principles.

Besides, any characteristic, variant or embodiment described for a method is compatible with an apparatus device comprising means for processing the disclosed method, with a device comprising a processor configured to process the disclosed method, with a computer program product comprising program code instructions and with a non-transitory computer-readable storage medium storing program instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "WTRU" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (WTRU), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra-Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed"

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM") or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in a wireless transmit-receive unit (WTRU) the method comprising:
receiving first configuration information indicating a configuration of reference signals and second configuration information indicating a configuration of reference information associated with a set of cells of a configurable reflective surface;
receiving the reference signals according to the first configuration information;
selecting, based on measurements performed by the WTRU on the received reference signals, a subset of cells of the configurable reflective surface from the reference information; and
transmitting a reporting message comprising information related to the selected subset of cells of the configurable reflective surface.

2. The method according to claim 1, wherein the selected subset of cells is comprised in a first reference matrix, D, selected by the WTRU from a set of reference matrices comprised in the second configuration information.

3. The method according to claim 2, wherein the reporting message comprises an indication of the selected first reference matrix.

4. The method according to claim 2, comprising determining a second matrix, R, based on the selected first reference matrix, D.

5. The method according to claim 4, wherein the reporting message comprises an indication of at least one column of the determined second matrix, R.

6. The method according to claim 5, wherein the reporting message comprises an indication of, or value for, at least one entry in the indicated at least one column of the determined second matrix, R.

7. A wireless transmit-receive unit (WTRU) device, the WTRU device comprising at least one processor configured to:
receive first configuration information indicating a configuration of reference signals and second configuration information indicating a configuration of reference information associated with a set of cells of a configurable reflective surface;
receive the reference signals according to the first configuration information;
select, based on measurements performed by the WTRU device on the received reference signals, a subset of cells of the configurable reflective surface from the reference information; and
transmit a reporting message comprising information related to the selected subset of cells of the configurable reflective surface.

8. The WTRU according to claim 7, wherein the selected subset of cells is comprised in a first reference matrix, D, selected by the WTRU from a set of reference matrices comprised in the second configuration information.

9. The WTRU according to claim 8, wherein the at least one processor is configured to comprise, in the reporting message, an indication of the selected first reference matrix.

10. The WTRU according to claim 8, wherein the at least one processor is configured to determine a second matrix, R, based on the selected first reference matrix, D.

11. The WTRU according to claim 10, wherein the at least one processor is configured to comprise, in the reporting message, an indication of at least one column of the determined second matrix, R.

12. The WTRU according to claim 11, wherein the reporting message comprises an indication of, or value for, at least one entry in the indicated at least one column of the determined second matrix, R.

* * * * *